(12) United States Patent
Dalla Betta et al.

(10) Patent No.: US 7,727,419 B2
(45) Date of Patent: Jun. 1, 2010

(54) REFORMER AND REFORMING PROCESS FOR PRODUCTION OF HYDROGEN FROM HYDROCARBON FUEL

(75) Inventors: Ralph A. Dalla Betta, Mountain View, CA (US); Jacques F. Nicole, Sunnyvale, CA (US)

(73) Assignee: Eaton Corporation, Cleveland, OH (US)

( * ) Notice: Subject to any disclaimer, the term of this patent is extended or adjusted under 35 U.S.C. 154(b) by 896 days.

(21) Appl. No.: 11/473,953

(22) Filed: Jun. 22, 2006

(65) Prior Publication Data

US 2007/0036707 A1 Feb. 15, 2007

Related U.S. Application Data

(60) Provisional application No. 60/693,140, filed on Jun. 22, 2005.

(51) Int. Cl.
*C07C 1/02* (2006.01)
*C01B 3/24* (2006.01)
*C01B 3/26* (2006.01)

(52) U.S. Cl. .................. 252/373; 423/650; 423/652

(58) Field of Classification Search ................... 252/373
See application file for complete search history.

(56) References Cited

U.S. PATENT DOCUMENTS

| | | | |
|---|---|---|---|
| 5,525,322 A | 6/1996 | Willms | |
| 6,161,378 A | 12/2000 | Hanaoka et al. | |
| 6,274,106 B1 | 8/2001 | Held | |
| 6,508,057 B1 | 1/2003 | Bouchez et al. | |
| 6,521,204 B1 | 2/2003 | Borup et al. | |
| 6,637,189 B1 | 10/2003 | Boegner et al. | |
| 6,823,662 B1 | 11/2004 | Yamamoto et al. | |
| 6,845,610 B2 | 1/2005 | Shiino et al. | |
| 7,153,334 B2 * | 12/2006 | Ellis et al. | 48/198.7 |
| 7,240,483 B2 | 7/2007 | Cizeron et al. | |
| 7,344,789 B2 * | 3/2008 | Barber et al. | 429/17 |

(Continued)

FOREIGN PATENT DOCUMENTS

WO 01/76731 A1 10/2001

(Continued)

OTHER PUBLICATIONS

ISA Report and Opinion for related application PCT/US2006/024834.

(Continued)

*Primary Examiner*—Melvin C Mayes
*Assistant Examiner*—Kenneth Vaden
(74) *Attorney, Agent, or Firm*—Paul V. Keller

(57) ABSTRACT

The invention provides methods and systems for catalytic reforming of a hydrocarbon fuel to produce hydrogen, which may be used as a power source for a fuel cell. In some embodiments, hydrogen is produced by partial oxidation or autothermal reforming of fuel in an oxygen containing gas stream that is rich the majority of the time, with periodic conversion to a lean gas stream for short periods of time to maintain catalytic activity. In one embodiment, hydrogen peroxide is used as the oxidant in an autothermal reforming process. In some embodiments, hydrogen is produced by steam reforming at a low steam to carbon ratio, with a periodic increase in the steam to carbon ratio for short periods of time to maintain catalytic activity.

6 Claims, 9 Drawing Sheets

U.S. PATENT DOCUMENTS

| | | |
|---|---|---|
| 2001/0052232 A1 | 12/2001 | Hoffmann et al. |
| 2003/0000145 A1 | 1/2003 | Salemi et al. |
| 2003/0079466 A1 | 5/2003 | Surnilla |
| 2004/0050037 A1 | 3/2004 | Betta et al. |
| 2004/0163311 A1 | 8/2004 | Ahmed et al. |
| 2005/0123472 A1 | 6/2005 | Hall et al. |

FOREIGN PATENT DOCUMENTS

| | | |
|---|---|---|
| WO | 2004/000724 A1 | 12/2003 |

OTHER PUBLICATIONS

European Search Report and Opinion for related application EP 06774024.1.

* cited by examiner

REFORMER AND REFORMING PROCESS FOR PRODUCTION OF HYDROGEN FROM HYDROCARBON FUEL

CROSS-REFERENCE TO RELATED APPLICATIONS

This application claims the benefit of U.S. provisional application no. 60/693,140, filed Jun. 22, 2005, the contents of which are hereby incorporated by reference in their entirety.

TECHNICAL FIELD

The invention relates to methods and devices for production of hydrogen by reforming of a hydrocarbon fuel on a reforming catalyst while maintaining the activity of the catalyst.

BACKGROUND

One common approach to convert a liquid hydrocarbon fuel into hydrogen for use in a fuel cell or other processes is to use autothermal reforming of the hydrocarbon. In this process, the hydrocarbon fuel is reacted with oxygen or air and water vapor at high temperature. The oxygen is combusted with the fuel to supply the energy needed to reach the required temperature and to supply the heat required by the endothermic reforming reaction. The water is added to provide the high steam-to-carbon ratio required by the reforming process. As the molecular weight of the hydrocarbon increases, for example from methane to a liquid hydrocarbon such as gasoline or diesel fuel, the level of steam required to maintain good catalyst activity also increases. Steam reforming of a hydrocarbon produces a mixture of CO and $H_2$ as well as byproducts of $CO_2$ and un-reacted $H_2O$. Usually the CO level is high, requiring conversion to $H_2$ by the water gas shift reaction, equation 1, which typically reduces the CO to about 1% due to the equilibrium limitation at the temperatures employed.

$$CO+H_2O \rightleftharpoons CO_2+H_2 \qquad \text{eq. 1}$$

The remaining CO must then be removed by a selective oxidation reaction with added $O_2$. The level of CO must be reduced to below 10 ppm for use of the product stream containing $H_2$ in a proton exchange membrane ("PEM") fuel cell.

Typical operating temperatures for an autothermal reformer are in the range of 600 to 800° C. With these high operating temperatures, the product gases from the reforming reaction can also exit the reforming section at a temperature of 600 to 800° C. Achieving and maintaining this high temperature represents a sizable portion of the input energy, and effective use of this energy is needed to maintain good fuel processor efficiency. The overall system requirements, including an autothermal reformer reactor, water gas shift reactor, selective CO oxidation reactor, and multiple heat exchangers, results in a system that is large, heavy and difficult to operate.

In general, it is difficult to catalytically reform liquid hydrocarbons to produce CO and $H_2$. Typically, this requires a high steam to carbon ratio to prevent the formation of coke or carbon on the catalyst surface, which will deactivate the catalyst and slow or stop the reforming reaction. While high levels of steam can be introduced into the catalytic reactor, this is not always desirable since it increases cost and for portable systems requires transportation of the extra liquid. The ability to reform liquid fuels becomes even more difficult when the liquid fuel contains sulfur, since the sulfur further deactivates the catalyst and requires even more steam to ameliorate this effect.

There is a need for a more compact and efficient autothermal reforming system for production of hydrogen gas from a hydrocarbon fuel. There is a need in a number of applications for a light and compact system for converting liquid fuels into hydrogen for use in a PEM fuel cell and for other devices and processes requiring hydrogen gas.

BRIEF SUMMARY OF THE INVENTION

The invention provides methods and devices for producing $H_2$ for use in a fuel cell or other device or process requiring $H_2$.

In one aspect, the invention provides a process for producing $H_2$ and CO, comprising introducing a hydrocarbon fuel into an $O_2$ containing gas stream to produce a rich mixture, wherein the hydrocarbon fuel is introduced upstream from a catalytic zone comprising a reforming catalyst and an oxidation catalyst, wherein the introduced fuel flows through the catalytic zone, wherein a portion of the hydrocarbon fuel in the rich mixture is oxidized on the oxidation catalyst and essentially all of the remaining hydrocarbon fuel is reformed on the reforming catalyst, thereby producing $H_2$ and CO, and wherein the gas stream is periodically converted to a lean mixture for a short period of time to maintain catalyst activity by reducing the concentration of introduced hydrocarbon fuel or increasing the concentration of $O_2$ in the gas stream. In one embodiment, the process further comprises mixing the gas stream in a mixing volume downstream of the catalytic zone, wherein the hydrogen concentration at the outlet of the mixing volume is substantially constant. In one embodiment, the gas stream further comprises $H_2O$ (steam), and the $H_2O$ is consumed in an autothermal reforming reaction with the hydrocarbon fuel on the reforming catalyst. In some embodiments, the fraction of time in which the gas stream is converted to a lean mixture is about 0.1% to about 20%. In some embodiments, heat from the gas stream exiting the catalytic zone is transferred to the gas stream upstream of the catalytic zone through a heat exchanger. In some embodiments, the hydrocarbon fuel is selected from the group consisting of gasoline, diesel fuel, JP8, JetA, or kerosene. In some embodiments, the reforming catalyst comprises one or more of Ni, Ru, Rh, Pd, and Pt. In some embodiments, the oxidation catalyst comprises one or more of Pd, Pt, Rh, Cu, Co, Fe, Ni, Ir, and Mo, for example, Pd or Pt or a combination thereof. In some embodiments, $H_2$ produced on the reforming catalyst is separated from other components of the gas stream with a selective diffusion membrane, for example, a diffusion membrane comprising Pd or a Pd alloy. In one embodiment, the diffusion membrane is coated with a catalyst active for the water gas shift reaction. In some embodiments, $H_2$ is introduced into a fuel cell.

In another aspect, the invention provides a process for producing $H_2$ and CO, comprising introducing a hydrocarbon fuel and $H_2O_2$ into a gas stream to produce a rich mixture, wherein the fuel is introduced upstream from a catalytic zone comprising a reforming catalyst and an oxidation catalyst, wherein the introduced fuel flows through the catalytic zone, wherein a portion of the hydrocarbon fuel in the rich mixture is oxidized on the oxidation catalyst and essentially all of the remaining hydrocarbon fuel is reformed on the reforming catalyst, thereby producing $H_2$ and CO, and wherein the gas stream is periodically converted to a lean mixture for a short period of time to maintain catalyst activity by reducing the concentration of introduced hydrocarbon fuel or increasing the concentration of $H_2O_2$ in the gas stream. $H_2O_2$ decomposes to $O_2$, which is a reactant in a combustion reaction, and $H_2O$, which is a reactant in a reforming reaction. In one embodiment, the process further comprises mixing the gas stream in a mixing volume downstream of the catalytic zone, wherein the hydrogen concentration at the outlet of the mixing volume is substantially constant. In some embodiments, the fraction of time in which the gas stream is converted to a lean mixture is about 0.1% to about 20%. In some embodiments, heat from the gas stream exiting the catalytic zone is transferred to the gas stream upstream of the catalytic zone through a heat exchanger. In some embodiments, the hydrocarbon fuel is selected from the group consisting of gasoline, diesel fuel, JP8, JetA, or kerosene. In some embodiments, the reforming catalyst comprises one or more of Ni, Ru, Rh, Pd, and Pt. In some embodiments, the oxidation catalyst comprises one or more of Pd, Pt, Rh, Cu, Co, Fe, Ni, Ir, and Mo, for example, Pd or Pt or a combination thereof. In some embodiments, $H_2$ produced on the reforming catalyst is separated from other components of the gas stream with a selective diffusion membrane, for example, a diffusion membrane comprising Pd or a Pd alloy. In one embodiment, the diffusion membrane is coated with a catalyst active for the water gas shift reaction. In some embodiments, $H_2$ is introduced into a fuel cell.

In another aspect, the invention provides a process for producing $H_2$ and CO, comprising introducing a hydrocarbon fuel into a gas stream to produce a rich mixture, wherein the gas stream comprises $H_2O$, wherein the fuel is introduced upstream from a catalytic zone comprising a reforming catalyst, wherein the introduced fuel flows through the catalytic zone, wherein essentially all of the hydrocarbon fuel is reformed on the reforming catalyst, thereby producing $H_2$ and CO, and wherein the $H_2O$ to carbon ratio in the gas stream is periodically increased for a short period of time to maintain catalyst activity by reducing hydrocarbon fuel concentration or increasing $H_2O$ concentration in the gas stream. In one embodiment, the $H_2O$ to carbon ratio is periodically increased by a factor of about 2 to about 10. In one embodiment, the process further comprises mixing the gas stream in a mixing volume downstream of the catalytic zone, wherein the hydrogen concentration at the outlet of the mixing volume is substantially constant. In some embodiments, the fraction of time in which the steam to carbon ratio is increased is about 0.1% to about 20%. In some embodiments, heat from the gas stream exiting the catalytic zone is transferred to the gas stream upstream of the catalytic zone through a heat exchanger. In some embodiments, the hydrocarbon fuel is selected from the group consisting of gasoline, diesel fuel, JP8, JetA, or kerosene. In some embodiments, the reforming catalyst comprises one more of Ni, Ru, Rh, Pd, and Pt. In some embodiments, $H_2$ produced on the reforming catalyst is separated from other components of the gas stream with a selective diffusion membrane, for example, a diffusion membrane comprising Pd or a Pd alloy. In one embodiment, the diffusion membrane is coated with a catalyst active for the water gas shift reaction. In some embodiments, $H_2$ is introduced into a fuel cell.

In another aspect, the invention provides a system for producing $H_2$ and CO, comprising an inlet, a catalytic zone comprising a reforming catalyst and an oxidation catalyst, an outlet, an $O_2$ containing gas stream flowing from the inlet to the outlet through the catalytic zone, and a reservoir comprising a hydrocarbon fuel, wherein the reservoir is in fluid communication with the gas stream upstream from the catalytic zone and downstream from the inlet, wherein the system is configured to introduce hydrocarbon fuel from the reservoir upstream from the catalytic zone to form a rich mixture in the gas stream flowing from the inlet to the outlet, wherein the rich mixture flows through the catalytic zone, wherein the system is configured to introduce a sufficient amount of hydrocarbon fuel such that as the rich mixture flows through the catalytic zone, a portion of the introduced hydrocarbon fuel is oxidized on the oxidation catalyst and essentially all of the remaining hydrocarbon fuel is reformed on the reforming catalyst, thereby producing $H_2$ and CO, and wherein the system is configured to periodically convert the gas stream to a lean mixture for a short period of time to maintain catalyst activity by reducing the concentration of introduced hydrocarbon fuel or increasing the concentration of $O_2$ in the gas stream. In one embodiment, the gas stream further comprises $H_2O$, and the $H_2O$ is consumed in an autothermal reforming reaction with the hydrocarbon fuel on the reforming catalyst. In one embodiment, the system further comprises a mixing volume downstream of the catalytic zone, wherein the hydrogen concentration at the outlet of the mixing volume is substantially constant. In some embodiments, the fraction of time in which the gas stream is converted to a lean mixture is about 0.1% to about 20%. In some embodiments, heat from the gas stream exiting the catalytic zone is transferred to the gas stream upstream of the catalytic zone through a heat exchanger. In some embodiments, the hydrocarbon fuel is selected from the group consisting of gasoline, diesel fuel, JP8, JetA, or kerosene. In some embodiments, the reforming catalyst comprises one or more of Ni, Ru, Rh, Pd, and Pt. In some embodiments, the oxidation catalyst comprises one or more of Pd, Pt, Rh, Cu, Co, Fe, Ni, Ir, and Mo, for example, Pd or Pt or a combination thereof. In some embodiments, $H_2$ produced on the reforming catalyst is separated from other components of the gas stream with a selective diffusion membrane, for example, a diffusion membrane comprising Pd or a Pd alloy. In one embodiment, the diffusion membrane is coated with a catalyst active for the water gas shift reaction. In some embodiments, $H_2$ is introduced into a fuel cell. In some embodiments, the system comprises a fuel cell, wherein $H_2$ separated through a selective diffusion membrane is introduced into the fuel cell.

In another aspect, the invention provides a system for producing $H_2$ and CO, comprising an inlet, a catalytic zone comprising a reforming catalyst and an oxidation catalyst, an outlet, an $O_2$ containing gas stream flowing from the inlet to the outlet through the catalytic zone, a reservoir comprising a hydrocarbon fuel, and a reservoir comprising $H_2O_2$, wherein the reservoirs are in fluid communication with the gas stream upstream from the catalytic zone and downstream from the inlet, wherein the system is configured to introduce hydrocarbon fuel and $H_2O_2$ from the reservoirs upstream from the catalytic zone to form a rich mixture in the gas stream flowing from the inlet to the outlet, wherein the rich mixture flows through the catalytic zone, wherein the system is configured to introduce a sufficient amount of hydrocarbon fuel such that as the rich mixture flows through the catalytic zone, a portion of the injected hydrocarbon fuel in the rich mixture is oxidized on the oxidation catalyst and essentially all of the remaining hydrocarbon fuel is reformed on the reforming catalyst, thereby producing $H_2$ and CO, and wherein the system is configured to periodically convert the gas stream to a lean mixture for a short period of time to maintain catalyst activity by reducing the concentration of introduced hydrocarbon fuel or increasing the concentration of introduced $H_2O_2$ in the gas stream. In one embodiment, the system further comprises a mixing volume downstream of the catalytic zone, wherein the hydrogen concentration at the outlet of the mixing volume is substantially constant. In some embodiments, the fraction of time in which the gas stream is converted to a lean mixture is about 0.1% to about 20%. In some embodiments, heat from the gas stream exiting the catalytic zone is transferred to the gas stream upstream of the catalytic zone through a heat exchanger. In some embodiments, the hydrocarbon fuel is selected from the group consisting of gasoline, diesel fuel, JP8, JetA, or kerosene. In some embodiments, the reforming catalyst comprises one or more of Ni, Ru, Rh, Pd, and Pt. In some embodiments, the oxidation catalyst comprises one or more of Pd, Pt, Rh, Cu, Co, Fe, Ni, Ir, and Mo, for example, Pd or Pt or a combination thereof. In some embodiments, $H_2$ produced on the reforming catalyst is separated from other components of the gas stream with a selective diffusion membrane, for example, a diffusion membrane comprising Pd or a Pd alloy. In one embodiment, the diffusion membrane is coated with a catalyst active for the water gas shift reaction. In some embodiments, $H_2$ is introduced into a fuel cell. In some embodiments, the system comprises a fuel cell, wherein $H_2$ separated through a selective diffusion membrane is introduced into the fuel cell.

In another aspect, the invention provides a system for producing $H_2$ and CO, comprising an inlet, a catalytic zone comprising a reforming catalyst, an outlet, a gas stream flowing from the inlet to the outlet through the catalytic zone, and a reservoir comprising a hydrocarbon fuel, wherein the reservoir is in fluid communication with the gas stream upstream from the catalytic zone and downstream from the inlet, wherein the gas stream comprises $H_2O$, wherein the system is configured to introduce hydrocarbon fuel from the reservoir upstream from the catalytic zone to form a rich mixture in the gas stream flowing from the inlet to the outlet, wherein the rich mixture flows through the catalytic zone, wherein as the rich mixture flows through the catalytic zone, essentially all of the hydrocarbon fuel is reformed on the reforming catalyst, thereby producing $H_2$ and CO, and wherein the system is configured to increase the $H_2O$ to carbon ratio in the gas stream periodically for a short period of time to maintain catalyst activity in the gas stream by reducing hydrocarbon fuel concentration or increasing $H_2O$ concentration in the gas stream. In one embodiment, the system further comprises a mixing volume downstream of the catalytic zone, wherein the hydrogen concentration at the outlet of the mixing volume is substantially constant. In some embodiments, the fraction of time in which the steam to carbon ratio is increased is about 0.1% to about 20%. In some embodiments, heat from the gas stream exiting the catalytic zone is transferred to the gas stream upstream of the catalytic zone through a heat exchanger. In some embodiments, the hydrocarbon fuel is selected from the group consisting of gasoline, diesel fuel, JP8, JetA, or kerosene. In some embodiments, the reforming catalyst comprises one or more of Ni, Ru, Rh, Pd, and Pt. In one embodiment, the $H_2O$ to carbon ratio is periodically increased by a factor of about 2 to about 10. In some embodiments, $H_2$ produced on the reforming catalyst is separated from other components of the gas stream with a selective diffusion membrane, for example, a diffusion membrane comprising Pd or a Pd alloy. In one embodiment, the diffusion membrane is coated with a catalyst active for the water gas shift reaction. In some embodiments, $H_2$ is introduced into a fuel cell. In some embodiments, the system comprises a fuel cell, wherein $H_2$ separated through a selective diffusion membrane is introduced into the fuel cell.

In some embodiments of the systems described herein, the reforming catalyst is in thermal contact with a variable thermal conductance layer, wherein the variable conductance layer is in contact with a cooling medium and wherein the variable conductance layer exhibits an increase in thermal conductivity at a temperature close to the desired operating temperature of the reforming catalyst. In one embodiment, the cooling medium is a flowing gas stream. In one embodiment, the reforming catalyst is coated on a finned structure with a larger geometric area and the gas stream comprising hydrocarbon fuel flows over the finned structure. In one embodiment, heat conducted through the variable conductance layer passes into a finned structure that is exposed to the cooling medium. As used herein, a "finned structure" refers to a structure containing a wall and thin sections extending perpendicular to the wall such that the geometric surface area exposed by the wall is increased substantially.

The invention also provides $H_2$ produced according any of the methods of the invention described herein or produced in any of the fuel processing devices described herein. The invention also provides a fuel cell comprising $H_2$ produced by any of the methods or with any of the devices described herein.

DETAILED DESCRIPTION

Figure 1:
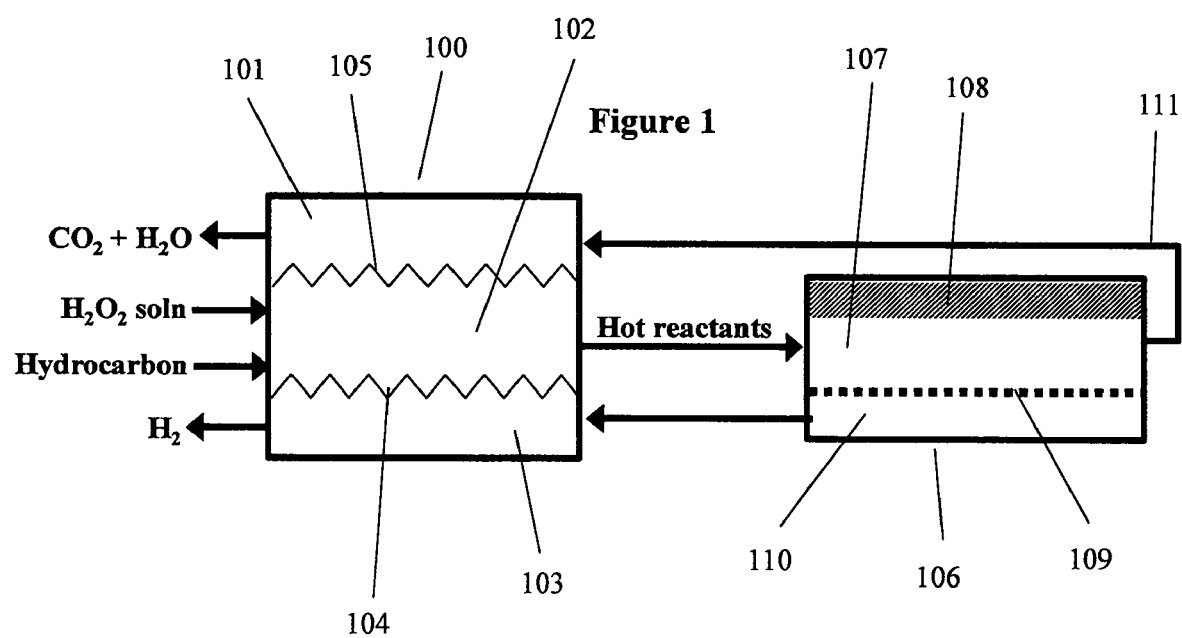
FIG. 1 schematically depicts an embodiment of a fuel processor for reforming of hydrocarbon fuel to hydrogen, using hydrogen peroxide as a reactant.

The invention provides methods and devices for production of hydrogen from a hydrocarbon fuel. The hydrogen gas produced according to the invention may be used as a power source for a fuel cell. In methods of the invention, hydrogen is produced in a gas stream that is overall rich by reforming of hydrocarbon fuel that is introduced into the gas stream on a reforming catalyst. In various embodiments, reforming takes place in the context of partial oxidation, autothermal reforming, or steam reforming, as described in greater detail herein.

The rich gas stream produced by hydrocarbon fuel injection is periodically converted to a lean mixture for short periods of time (for partial oxidation or autothermal reforming processes), or the steam to carbon ratio is periodically increased (for a steam reforming process), which maintains catalyst activity, and thus maintains hydrogen output at a substantially constant desired level during the time of operation.

In U.S. patent application nos. 2003/0101713, 2004/0050037, and 2004/0187483, processes are described in which fuel is injected into a lean exhaust stream and passed through a catalytic zone, creating a rich mixture to produce $H_2$ and CO for a short period of time. In all cases described in these applications, the exhaust is lean for long periods of time. These devices are not configured to produce $H_2$ for use in a fuel cell because the average amount of hydrogen produced is low, since the fraction of time these systems are operated rich and producing $H_2$ is small, typically less than 50% and generally less than 10%. None of these applications describes a process in which hydrocarbon fuel is added to a gas stream to produce a gas stream that is overall rich over the time period of operation and in which the rich gas stream is converted to a lean mixture (or an increased steam to carbon ratio) for short periods of time to maintain catalyst activity and the level of hydrogen produced. None of these applications describes a process in which a gas stream containing a high concentration of $H_2$ is produced for use in a fuel cell or other device or process in which a high concentration of $H_2$ is required. To produce a steam containing a high concentration of $H_2$, the process has to run rich continuously or for a very large fraction of the time. Such a process was not described in these applications.

Reforming of Hydrocarbon Fuel to Produce Hydrogen

In some embodiments, the invention provides methods and devices for production of hydrogen that entail reforming of hydrocarbon fuel on a reforming catalyst in a rich gas stream, with periodic conversion of the rich gas stream to a lean mixture for short periods of time. The lean periods serve to effect cleaning of the catalyst, maintaining catalytic activity of the reforming catalyst while maintaining hydrogen production at a high and substantially constant level This advantageously enables hydrogen to be produced at a low steam-to-carbon ratio. This process is applicable to partial oxidation, autothermal reforming systems, and systems utilizing hydrogen peroxide as an oxidant, as described in further detail herein. In such processes, an oxygen containing gas stream is used, with hydrocarbon fuel added to generate a rich mixture. Periodic lean operation can be effected by increasing the oxidant flow rate or by decreasing the hydrocarbon fuel flow rate in the gas stream. In an embodiment wherein the hydrocarbon fuel flow is decreased, the fuel flow may either be stopped or decreased to create the required lean condition. In processes of the invention utilizing an oxygen containing gas stream (e.g., partial oxidation, autothermal reforming, hydrogen peroxide as oxidant), hydrocarbon fuel is introduced into the gas stream upstream from a catalytic zone that includes an oxidation catalyst and a reforming catalyst. A portion of the added hydrocarbon fuel is oxidized on an oxidation catalyst and essentially all of the remaining fuel is reformed on a reforming catalyst to produce hydrogen and carbon monoxide. Essentially all of the oxygen in the gas stream consumed in the oxidation reaction and substantially no oxygen exiting the catalytic zone.

"Equivalence ratio" as used herein refers to the ratio between actual amount of fuel and the theoretical stoichiometric amount of fuel which would be required to fully react with all of the $O_2$ present in a gas mixture. As used herein, "lean" refers to a fuel air equivalence ratio less than 1.0 and "rich" refers to a fuel air equivalence ratio greater than 1.0. A rich zone is produced in the flowing gas stream when fuel is added such that the equivalence ratio in the portion of the gas stream to which the fuel has been added has an equivalence ratio greater than 1. A lean zone is produced either when no fuel is added or when fuel is added in an amount such that the equivalence ratio in the portion of the gas stream to which the fuel has been added is less than 1.

In other embodiments, utilizing steam reforming for production of hydrogen, hydrocarbon fuel is introduced into a steam-containing gas stream flowing through a catalytic zone that includes a reforming catalyst, and the fuel is reformed on the reforming catalyst to produce hydrogen and carbon monoxide. The steam to carbon ratio is increased periodically, for example by a factor of 2 to 10, which serves to maintain catalytic activity of the reforming catalyst while maintaining hydrogen output at a high and substantially constant level.

Any of the processes and devices described herein may be used to produce $H_2$ containing reformate that is then processed for use as the fuel for a PEM fuel cell.

The invention also provides a high density and portable fuel processing system capable of generating PEM quality hydrogen from common liquid heavy hydrocarbon fuels such as diesel utilizing methods for production of hydrogen as described herein. When the fuel processor is combined with a compact PEM fuel cell, the power generating potential exceeds a Lithium-Ion battery of similar size and weight by 2.5 fold.

The processes and systems of the invention are directed to production of a substantially constant stream of hydrogen for use in a fuel cell or other downstream process requiring hydrogen. While the shift form a rich mixture to a lean mixture (or a high steam to carbon ratio for a steam reforming process) for a short period of time may result in a drop in the hydrogen production rate, the actual concentration of hydrogen at the point of use may be essentially constant. For example, for the system depicted in FIG. 1, where hydrogen is separated by diffusion through a selective diffusion membrane, the diffusion tends to smooth out the hydrogen flow rate so that the hydrogen production rate will be essentially constant. Alternatively, a mixing volume may be placed downstream of the catalytic zone and this mixing volume will then mix the lower hydrogen concentration produced during a lean (or high steam to carbon) production period with the higher hydrogen concentration produced during rich operation. In some embodiments, the mixing volume is about 1 to about 5 times the volumetric flow during the lean (or high steam to carbon) operating period, for example, about 3 times the volumetric flow. For example, if the flow is 6 liters per minute, or 0.1 liter per second, and the lean period is 1 second, then the mixing volume would be from 0.1 to 0.5 liters. In general, a mixing volume may not be required since the downstream system and end use may provide the required level of mixing. In the case of a fuel cell, such components as the piping to the fuel cell, the humidifier for the incoming hydrogen, or the fuel cell manifold system, could provide the required mixing, so that the hydrogen concentration is essentially constant at the fuel cell. However, it should be noted that the lean (or high steam to carbon) period should be as short as possible to maximize hydrogen production and process efficiency.

Partial Oxidation and Autothermal Reforming

The invention provides partial oxidation and autothermal reforming processes for production of hydrogen. These processes include introduction of a hydrocarbon fuel to an oxygen containing gas stream upstream from a catalytic zone that includes both an oxidation catalyst and a reforming catalyst. In an autothermal reforming process, the gas stream further includes water (steam). A portion of the introduced hydrocarbon fuel is oxidized on the reforming catalyst, with essentially all of the oxygen in the gas stream consumed in a combustion reaction, and essentially all of the remaining fuel is reformed on the reforming catalyst, converting fuel and water to hydrogen and carbon monoxide. When hydrocarbon fuel is introduced into the oxygen containing gas stream, a rich mixture is generated. The gas stream is periodically converted to a lean mixture for short periods of time to clean the catalyst and maintain catalytic activity of the reforming catalyst and hydrogen production. The lean mixture may be produced by reducing hydrocarbon fuel concentration or raising oxygen concentration. In some embodiments, the gas stream is lean about 0.1% to about 20% of the time. In some embodiments, the gas stream is lean any of about 0.1, 0.5, 1, 5, 10, 15, or 20% of the time. In some embodiments, the gas stream is lean any of at least about 0.1, 0.5, 1, 5, 10, or 15% of the time, with an upper limit of any of at least about 0.5, 5, 10, 15, or 20% of the time. It is desirable that the fraction of time the gas stream is lean is small, since during this time hydrogen production could be reduced and the overall hydrogen production rate of the process will decrease. A preferred process is one in which the hydrogen output rate and hydrogen concentration remain substantially constant over time.

The invention also provides a system for production of hydrogen. The system includes a fuel processor to produce a reducing gas mixture from a hydrocarbon fuel. The fuel processor includes a catalytic zone that contains oxidation and reforming catalysts. The catalysts are in contact with an oxygen containing gas stream flowing through the catalytic zone. Hydrocarbon fuel is introduced into the gas stream upstream from the catalytic zone, for example with a fuel injector.

The fuel injector can be of the type used for fuel injection on automobile engines where the fuel is pressurized and upon actuation of the fuel injector, the fuel is atomized into small droplets by passage through small holes. These injectors are typically of the pulse width modulated type where the fuel flow is controlled by the fraction of time the injector is open. It should be noted that when such injectors are used to inject fuel into an oxygen or steam containing gas, the pulses from such an injector must be sufficiently rapid and mixing upstream of the catalyst must be sufficient so that the hydrocarbon concentration entering the catalytic zone is essentially constant. Such injectors typically operate from 10 Hz to 200 Hz (cycles per second) and generally produce an essentially constant flow. Other injector types are gas atomizing injectors where the fuel and some gas is forced through a small opening to produce a mixture of the gas and small droplets of the fuel. Another type of fuel injector would be a vaporizing injector where the fuel is added to the gas stream and heated to vaporize the fuel which is then mixed with the gas stream. It is desirable that the injector system allow quickly stopping or increasing or decreasing flow so that the short lean period or short period of high steam to carbon ratio can be achieved.

The gas stream contains a rich mixture for the majority of the time that the system is in operation, and is cycled to a lean mixture for short periods of time to maintain catalytic activity. All or substantially all of the $O_2$ that is introduced is consumed in a combustion reaction with a portion of the introduced hydrocarbon fuel on a combustion catalyst, which provides heat for reforming the remaining hydrocarbon fuel on a reforming catalyst. The oxidation catalyst and the reforming catalyst can be the same catalyst or it can be different catalysts. If different catalysts are used, the catalyst can be placed sequentially in the reactor flow path or the catalysts can be mixed together and uniformly distributed in the reactor. It is also possible to place the catalysts in a graded structure, with the fraction of each component increasing or decreasing in the reactor flow path. During lean operation, the oxygen is substantially combusted on the catalyst such that the final product is rich and contains no or substantially no $O_2$. The percentage of time lean for the inventive process is typically less then about 20%, often less then about 10% of the time lean. The function of the periodic operation is to periodically clean and/or reactivate the catalyst and thus maintain catalyst activity, rather than to control temperature of the catalyst.

The invention provides methods and devices wherein liquid hydrocarbon fuel is reformed using a process in which the composition of a flowing oxygen containing gas stream that flows through the catalytic zone of the fuel processor is changed so that it is periodically lean. For example, the gas stream may include a hydrocarbon fuel, e.g., diesel fuel, and air in a partial oxidation or autothermal reforming process. In one embodiment, the air feed is continuous while the hydrocarbon feed is periodically decreased or stopped so the feed stream becomes lean in fuel, i.e., contains excess oxygen. The short lean period of operation cleans the catalyst and maintains catalyst activity, thus enhancing reforming of the hydrocarbon during the rich operation period. In some embodiments, the hydrogen concentration at the outlet of the catalytic zone during a lean operation period is about 20% to about 80% of the hydrogen concentration during a rich operation period.

Endothermic Steam Reforming

For reforming of some light hydrocarbons such as methanol, ethanol, methane, ethane, and propane, a continuous flow of reactants (e.g., hydrocarbon and steam) with a low steam-to-carbon ratio can be reformed at reasonable temperatures. Typically the $H_2O$ to "C" or steam to carbon molar ratio should be in the range of 2 to 4 for such light hydrocarbons. The use of a steam-to-carbon ratio is common in discussion of hydrocarbon reforming and represents the mol ratio of steam or $H_2O$ to hydrocarbon expressed as C1 in the reactant stream. For some heavier hydrocarbons such as gasoline and diesel fuel, and especially for hydrocarbon fuels containing sulfur, it has been found that the steam to carbon ratio must be inordinately high, in the range of 5 to 10, or the reaction temperature must be inordinately high, above 800° C., to obtain a reasonable rate of reforming and to prevent catalyst deactivation. If the rate of reforming is too low, a large amount of catalyst is required and the device is too costly or too large to be practical.

Stable performance at lower steam to carbon ratios can be obtained by operating the reformer in a periodic or cyclic manner with a varying steam to carbon ratio. This may be achieved by using a varying feed rate of hydrocarbon or steam. The hydrocarbon feed rate can be decreased only slightly or the steam concentration increased to obtain a higher steam to carbon ratio or the hydrocarbon feed rate can be stopped completely to allow a very high steam concentration to clean or reactivate the reforming catalyst. Periodic or cyclic operation can also be obtained by holding the hydrocarbon flow rate constant and varying the flow rate of steam. In some embodiments, the steam to carbon ratio is increased by a factor of about 2 (e.g., by increasing the steam flow by 100% of decreasing the fuel flow by 50%) to about 10 (e.g., by increasing the steam flow by 1000% or decreasing the fuel flow by 90%) for short periods of time. In some embodiments, the steam to carbon ratio is increased by a factor of any of about 2, 3, 4, 5, 6, 7, 8, 9, or 10 for short periods of time. In some embodiments, the steam to carbon ratio is increased about 0.1% to about 20% of the time. In some embodiments, the steam to carbon ratio is increased any of about 0.1, 0.5, 1, 5, 10, 15, or 20% of the time. In some embodiments, the steam to carbon ratio is increased any of at least about 0.1, 0.5, 1, 5, 10, or 15% of the time, with an upper limit of any of at least about 0.5, 5, 10, 15, or 20% of the time.

An example of the inventive process is a steam reforming operation in which the steam-to-carbon ratio is about 2. A steam to carbon ratio of 2 means that the moles of steam as $H_2O$ feed to the steam reforming catalyst is 2 times the moles of carbon feed to the catalyst where the moles of carbon is determined as moles of carbon atoms. Periodically, the fuel flow can be reduced or stopped and the steam flow maintained. This increases the steam-to-carbon ratio. If the fuel flow is decreased by 50%, the steam-to-carbon ratio increases to 4. If the fuel is decreased by 90%, then the steam-to-carbon ratio is increased to 20. If the fuel flow is stopped, the stream-to-carbon ratio is increased to infinity. This increase in steam-to-carbon ratio can similarly clean the catalyst and help to maintain the catalyst activity. This periodic high steam-to-carbon ratio process allows operation of a steam reformer at low steam-to-carbon ratios where operation normally would result in carbon deposition or coking and catalyst deactivation over some period of time. The periodic operation at high steam to carbon ratios maintains catalyst activity. In typical steam reforming operations, the steam to carbon ratio is in the range of 2 to 4 for small hydrocarbons such as methane and above 4 for larger hydrocarbon fuels such as liquefied petroleum gas, gasoline, kerosene or diesel fuel. In a typical cyclic operation, the steam to carbon ratio in the range of 1 to 4 can be increased to values of 5 to infinity. In general, the process may only need to increase the stream to carbon ratio by 2 fold. So a process operating at a steam to carbon ratio of 2 and showing an unacceptable rate of carbon deposition or catalyst deactivation can be periodically cycled to a steam to carbon ratio of 4 to 10 to maintain stable catalyst activity.

Cycle Time

The periodic lean operation or periodic high steam to carbon ratio operation can have a total cycle time of about 1 second to 10 minutes or longer, or even hours if the catalyst deactivation is slow. The fraction of time that the system is operated lean or with a high steam concentration during this cycle time can vary from about 0.1% to about 20%, often from about 0.1 to about 10%. For example, a cycle time of 10 sec could operate with 9 sec rich at the target autothermal reforming conditions and 1 sec lean for catalyst activity maintenance, equivalent to 10% lean time. Similarly, the steam to carbon ratio can be increased for 1 sec or for 10% of the total time. In some embodiments, the amount of time in which the system runs with a lean gas mixture or high steam to carbon ratio time ranges from about 0.1 sec to about 5 minutes. In some embodiments, during lean operation, the equivalence ratio may varies from 0 (no hydrocarbon fuel) to 0.95. In a steam reforming operation or in an autothermal process where steam is added, the steam flow can be increased so that the steam-to-carbon ratio is increased. In some embodiments of this type of operation, the steam-to-carbon ratio is increased from about 0.5 to infinity, or from about 1 to about 20. For a given process, the steam to carbon ratio is increased by a factor of about 2 to about 10 to substantially improve the catalyst stability. Alternatively, the hydrocarbon flow can be decreased to obtain the same increase in steam to carbon ratio.

In general, the cyclic lean operation or the periodic high steam-to-carbon operation must be limited so that the time averaged operation of the system is in the required equivalence range. For example, for partial oxidation and autothermal reforming processes, the average equivalence ratio must be >1.0 to reform the fuel to the desired $H_2$ and CO, and without combusting all of the fuel to $CO_2$ and $H_2O$. In addition, the ratio of oxidant to fuel must be in the required range to maintain the reactor temperature in the desired range. In some embodiments, the reactor temperature is maintained at about 500° C. to about 850° C. In the case of steam reforming, the time of operation at high steam to carbon ratios must not be so long that the overall usage of steam makes the process uneconomic.

Autothermal Reforming of Hydrocarbon Fuel in a System using $H_2O_2$ as an Oxygen and Water Source In one embodiment, the invention provides a fuel processor for autothermal reforming of a hydrocarbon fuel using a water solution of hydrogen peroxide to supply oxygen and water vapor. As hydrogen peroxide is heated, it decomposes to $O_2$ and $H_2O$. A hydrocarbon fuel such as propane, gasoline, kerosene, jet fuel or diesel fuel is fed with the hydrogen peroxide solution into the catalytic zone of a fuel processor for autothermal reforming. The hydrocarbon fuel and the hydrogen peroxide solution may be injected as a small droplet spray into the same heated channel or vaporizer passage where these components would then vaporize and form a mixed stream that would contact the catalyst. Alternatively, the hydrocarbon fuel and the hydrogen peroxide water solution can each be fed separately to separate channels, vaporized and then the separate vapor streams mixed prior to contacting the catalyst. This latter approach may be preferred if the hydrocarbon fuel is prone to pyrolysis at high temperatures in the presence of oxygen. The hydrocarbon fuel is partially oxidized on a combustion catalyst, which provides heat for reforming, and remaining fuel is then reformed on a reforming catalyst. This process converts oxygen, water and hydrocarbon to $H_2$, CO and $CO_2$. Periodically, the hydrocarbon fuel flow rate is decreased or stopped for a short period of time, resulting in a lean reaction mixture that contains excess oxygen. As discussed above, this can clean the catalyst and help to maintain catalytic activity. The use of hydrogen peroxide is advantageous because it is a storable liquid that can be pumped in as a liquid to accommodate operation at high pressures. Providing high pressure air is more difficult, because compressing a gas is less efficient and requires an air compressor, which may be a large and heavy piece of equipment and require a higher energy input. Hydrogen peroxide is generally available commercially in concentrations up to 90% by weight. In some embodiments, concentrations in the range of about 32% w/w to about 50% w/w of hydrogen peroxide in water are used, which provide steam-to-carbon ratios of about 2 to about 4 when the fuel and peroxide flow rate is adjusted to give the correct exothermic heat release rate. In some embodiments, a higher concentration with a steam to carbon ratio closer to 2 is preferred, to decrease the volume and weight of peroxide solution required for a given time of operation. In various embodiments, a hydrogen peroxide solution containing about 30 to about 32, about 32 to about 35, about 35 to about 40, about 40 to about 45, or about 45 to about 50% by weight is used.

In some embodiments, a hydrogen selective membrane is located within or near the catalytic zone to extract high purity hydrogen. The byproducts, $CO_2$ and $H_2O$, pass out of the autothermal reactor.

A schematic of one possible system design is shown in FIG. 1. A heat exchanger is incorporated to exchange the heat in the hot product gases with the cooler reactants. The incoming hydrocarbon and $H_2O_2$ solutions enter heat exchanger 100. Heat exchanger 100 is separated into compartments 101, 102 and 103, that share heat exchange surfaces 104 and 105 and allow heat to pass readily between the compartments. The reactants, $H_2O_2$ solution and hydrocarbon, are shown flowing into compartment 102, exchanging heat with the product streams and then passing into the autothermal reformer 106. As the reactants heat up, the $H_2O_2$ will substantially decompose to $O_2$ and $H_2O$ providing the desired reactant for the autothermal reforming process. The reactants pass through compartment 107 and react on catalyst 108 to form the products of $H_2$ and CO. This schematic diagram shows the $H_2O_2$ solution and the hydrocarbon in the same heat exchanger passages but as described above, the $H_2O_2$ solution and the hydrocarbon could be heated and vaporized in separate compartments and then mixed prior to contacting the catalyst 108.

The $H_2$ formed in this compartment can then diffuse to selective membrane 109, diffuse through this membrane and pass into compartment 110. Product $H_2$ flows back to the heat exchanger 100 and passes through compartment 103 exchanging heat with the incoming reactants. Similarly, the reaction byproducts flow through line 111 and then through heat exchanger compartment 101 where the heat in this stream is exchanged with the incoming reactant stream. To provide a driving force for the diffusion of $H_2$ through the selective membrane, the fuel and $H_2O_2$ can be pressurized and fed to the reactor system at high pressure. The high pressure $H_2$ then will diffuse through the selective membrane with sufficient residual pressure to drive the $H_2$ to the fuel cell system. The required pressure of the fuel and peroxide mixture is determined by the hydrogen concentration in the reformate and the required downstream pressure for operation of the fuel cell. Reactant fuel and peroxide pressures could be, for example, about 5 to about 50 atmospheres, often from about 8 to about 20 atmospheres.

The $H_2$ may then pass to a fuel cell where it may then be utilized by the fuel cell to produce electric power. In some embodiments, the $H_2$ is humidified with water vapor or used as it exits from the separation membrane. In some embodiments, the $H_2$ is fed to a fuel cell via a pipe or tubing. The $H_2$ exiting the fuel processor generally is at sufficient pressure to provide the driving force required for flow into the fuel cell. In one embodiment, a pump at the inlet to the fuel processor provides pressure that is sufficiently high to drive the reactants into the fuel processor and the $H_2$ product into the fuel cell.

A system in which $H_2O_2$ solution is a reactant has a number of advantages. Since all the reactants are liquid, they can be easily and efficiently pumped in allowing the autothermal reformer to operate above atmospheric pressure. If the fuel cell requires an $H_2$ stream close to atmospheric pressure, as is typically the case in a PEM fuel cell, operating the reformer section at higher pressure would provide a large pressure difference across the selective membrane to provide the driving force for the selective diffusion and purification of the $H_2$. This eliminates the need for an air compressor which can be bulky, costly and energy inefficient. A second advantage of this approach is that the $H_2$ product stream will include essentially pure $H_2$, allowing the PEM fuel cell to operate at a higher efficiency. A third advantage is that a single heat exchanger may be incorporated and designed as a countercurrent heat exchanger to efficiently transfer the heat from the high temperature product stream to the low temperature reactants stream. A fourth advantage is that the hydrogen selective membrane may be placed in proximity to the reforming catalyst. This will continuously remove the product hydrogen during the reforming reaction and drive the conversion of CO to additional $H_2$ via the water shift reaction, equation 1.

The schematic diagram shown in FIG. 1 depicts a general system approach and use of the components described herein. As will be apparent to a person of skill in the art, the specific design of the fuel processor may vary, depending on factors such as manufacturing process used in the fabrication of the heat exchanger, type of catalyst support or required exposed catalyst surface area, type of $H_2$ selective membrane used and required membrane geometry, type of liquid injection system used and the approach to achieving a vaporized and mixed reactant stream for the reforming catalyst.

Figure 2:
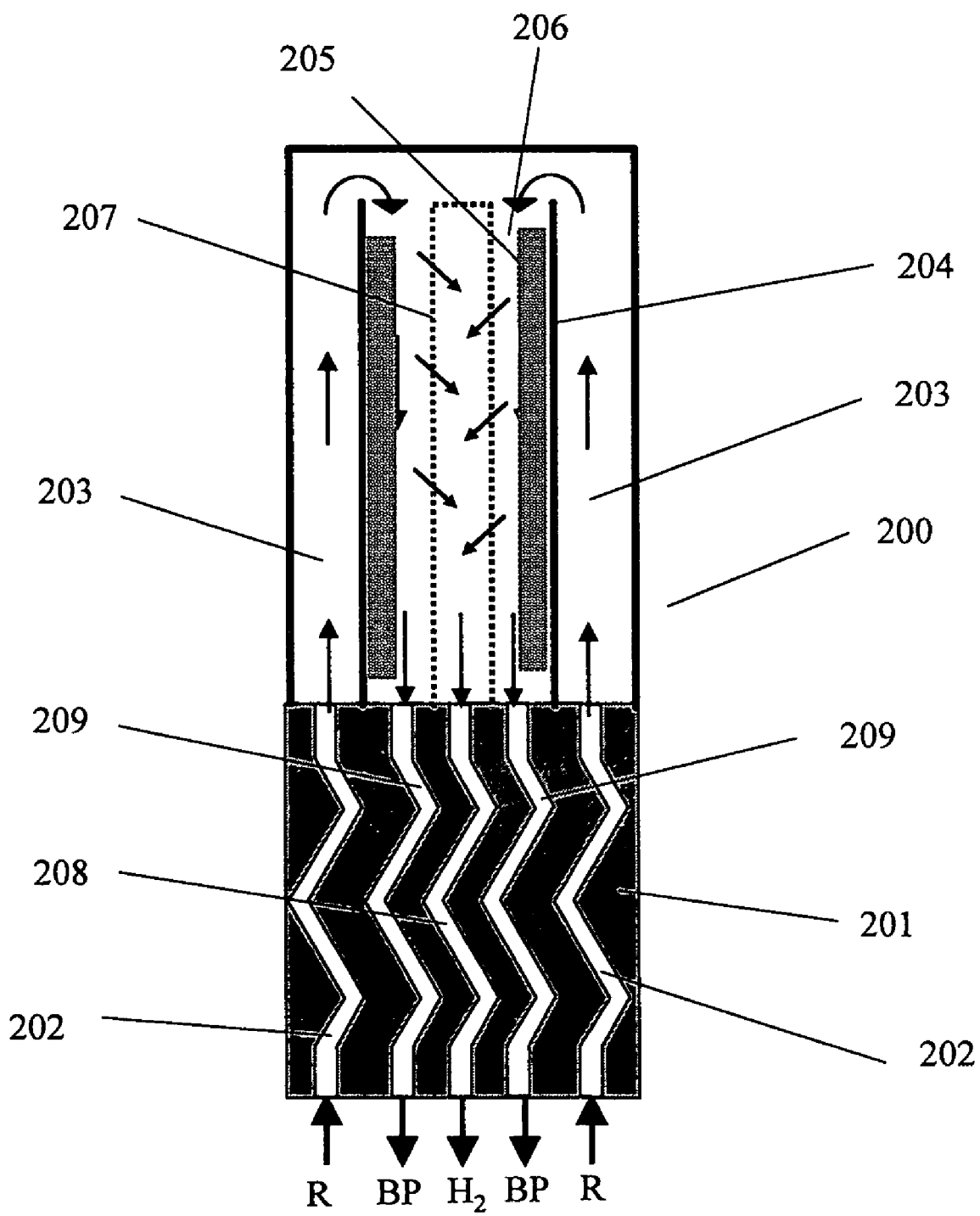
FIG. 2 schematically depicts an embodiment of a fuel processor for reforming of hydrocarbon fuel to hydrogen.

One design of a fuel processor for autothermal reforming is shown in FIG. 2. In this cross-sectional diagram, a complete fuel processor 200 is shown. A heat exchanger 201 is configured as a metal block with numerous channels through which the reactants and products flow. In one embodiment, reactants, R, comprising a hydrocarbon and a water solution of hydrogen peroxide, flow through channels 202, where the reactants are heated and the $H_2O_2$ is substantially decomposed to $O_2$ and $H_2O$ and then into annular space 203. A cylindrical tube 204 is coated on the inside surface with an autothermal catalyst layer 205. The reactants flow into channel 206 and past catalyst 205 where the $O_2$ and the hydrocarbon react to produce heat and increase the temperature to the desired range of 600 to 800° C. After most of the $O_2$ has been consumed, the remaining fuel is reformed to produce $H_2$ and CO. The $H_2$ diffuses to the selective membrane 207, and diffuses through the membrane driven by the pressure of the reformate product stream, and then passes into heat exchanger channels 208 and out of the device as product $H_2$. Byproducts from the reforming reaction, including $H_2O$, $CO_2$, unreacted CO and $H_2$, and other impurities pass through heat exchangers channels 209 and out of the fuel processor unit.

Although the system described above uses a hydrogen peroxide solution to provide the oxygen and water for the autothermal reforming process, an alternative system could use air to provide the oxygen to supply the exothermic heat and water to supply the added steam to give the desired steam-to-carbon ratio. This might be desired for larger systems where the added size, weight and complexity of an air compressor would be acceptable. The water could be provided directly as a liquid or it could be provided as a recycle stream from a fuel cell. In a PEM fuel cell, the cathode purge stream contains water and oxygen. A portion of this stream could be recycled, compressed and added to the other reactants entering the reformer unit. Water could also be injected using a liquid pump to provide the required pressure. The other processes occurring in the reformer system described above are essentially the same as with hydrogen peroxide as the oxidant. In some cases, air only could be the second reactant with the hydrocarbon fuel. The water for the stream reforming process would come from the combustion of fuel by the oxygen in the air. Such an air only system may be less efficient than other reactant systems since the amount of hydrogen produced is more limited. However, the use of only air as the reactant with the hydrocarbon fuel would simplify the overall system and could thus provide some advantages.

Heat Exchanger

In some embodiments, a heat exchanger is provided to provide heat to reactants entering a fuel processor for hydrogen production as described herein. The heat exchanger transfers heat from a gas stream downstream from the catalytic zone to the gas stream upstream of the catalytic zone. The heat exchanger can be formed of metal, ceramic or any other material with the required properties and structure for transfer heat from the hot product stream to the cooler reactant stream and to increase overall thermal efficiency in accordance with the invention.

In some embodiments, the heat exchanger 201 is formed of a solid block of metal with the desired heat transfer properties. Reactant and product flow channels can be formed as holes or passages through this metal block. In one embodiment, the block comprises substantially straight channels which are drilled or cast in the heat exchanger block with the walls of the channels providing the required heat exchange surface. Optionally, inserts are placed in at least some of the channels to increase turbulence and the effective heat exchange coefficient to increase heat exchange rate between the gas and the heat exchanger walls. In another embodiment, the block comprises channels formed so that they provide a tortuous path which increases the heat transfer from gas to the channel wall. The diameter, length and number of these channels will define exchange surface area and can be varied to obtain the desired performance. In the embodiment depicted in FIG. 2, the heat of the reaction is transferred to the cylinder 204 which contains a coating of reforming catalyst on the interior surface of the cylinder 204, thus allowing additional heat to be transferred to the reactant stream flowing in channel 203. This heat transfer can be increased if desired by adding fins or other elements to the outer surface of cylinder 204 with the fins protruding into channel 203.

In an embodiment, as depicted in FIG. 2, wherein $H_2O_2$ is used as a reactant, if the $H_2O_2$ is insufficiently decomposed when the reactants enter channel 206 and further decomposition is desired, a catalyst be added to the surface of the reactant channels 202 to catalyze the decomposition of $H_2O_2$ to $O_2$ and $H_2O$. This catalyst could additionally or alternatively be placed on the surfaces forming the annular space 203, e.g., on the surface of cylinder 204 facing the channel 203. Typical catalysts for the decomposition of hydrogen peroxide are well known in the art and include the metals in Groups VI, VII, VIII, or IB of the periodic table of the elements, or combinations thereof in either metallic or oxide form and can be either pure or supported on refractory oxides such as alumina, silica, zirconia, titania, ceria or mixtures of these oxides.

Figure 9:
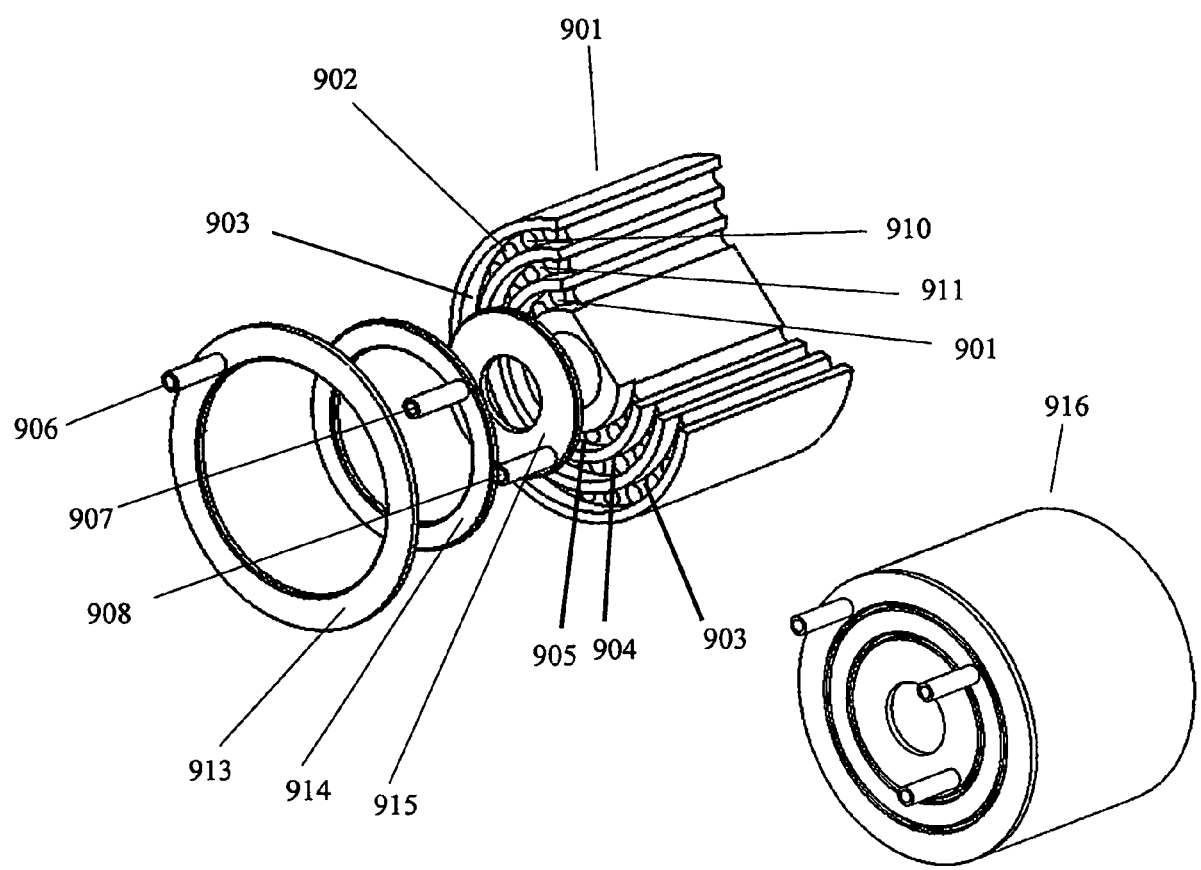
FIG. 9 schematically depicts one embodiment of a heat exchanger unit showing one approach to fabrication and assembly.

One example of a design of a heat exchanger section is shown in FIG. 9. The heat exchanger block 901 can be a solid metal block, a ceramic block or other material. The heat exchanger typically comprises a material with sufficient thermal conductivity to provide the thermal gradient necessary to transfer the heat required for the reforming reaction. The channels 902 are drilled or cast into the heat exchanger unit. This particular design has three different heat exchanger sections, 903, 904 and 905 for the different reactor and product streams. Each stream is fed to the heat exchanger unit through the inlet pipes 906, 907 and 908. These feed the manifold regions 910, 911 and 912 so that the flow into the inlet pipes pass into the manifolds and then feed all of the heat exchanger passages for that section. The manifolds are sealed by the cover plates 913, 914 and 915 which are placed on top of the manifold sections and welded, brazed or otherwise sealed in place to form the manifold. The final structure, 916, forms a structure similar to the heat exchanger unit 201 depicted in FIG. 2. A manifold similar to that described in FIG. 9 can be formed on the outlet side of the heat exchanger 916 to provide the flow of reactants into the annular zones, 203 and out of zones 206 and 207 of FIG. 2. The manifold covers 913, 914 and 915 on the other side of the heat exchanger can have multiple holes to provide a uniform flow of reactants into the regions 203 and extract flow from regions 206 and 207 of FIG. 2.

Reformer Design with Variable Conductance Layer

In some embodiments, a system of the invention includes a variable conductance layer to prevent overheating and destruction of the catalyst. An alternative reformer design capable of reforming under highly exothermic conditions and high operating temperatures is shown schematically in FIG. 10. This figure depicts a design in which the inlet fuel and oxidizing component mixture 1001 flow into the catalyst containing chamber 1002 and contact a catalyst layer 1003 coated onto a metal surface 1004. A cooling gas stream 1005 flows through a cooling chamber 1006 passing over a metal surface 1007. Metal components 1004 and 1007 are a chamber filled with a variable conductance material 1008 to provide a variable conductance layer. The excess heat from the reaction on catalyst 1003 can pass through metal layer 1004, variable conductance layer 1008 and metal layer 1007 and be extracted by cooling gas flow 1006.

In one embodiment, the variable conductance layer 1008 is a structure similar to that described in US Patent Application 2002/0059905, incorporated herein by reference. This patent application describes the use of a layer composed of a mixture of two powders consisting of component A typically a metal with a melting point $T_A$ and a ceramic component B. When the temperature of this layer is below $T_A$, the layer has the structure of a bed of packed particles. Since the thermal conductivity is limited by the contacts between the particles, this layer would have a relatively low thermal conductivity. When the temperature rises above $T_A$, component A melts and forms extensive necks and bridges between the ceramic particles and the thermal conductivity increases dramatically. An increase in thermal conductivity of 10 fold can be obtained. The actual magnitude of the thermal conductivity is determined by the choice of components A and B, the particle sizes, and the thickness of the variable thermal conductance layer. The transition temperature $T_A$ is determined by the selection of component A.

Figure 10:
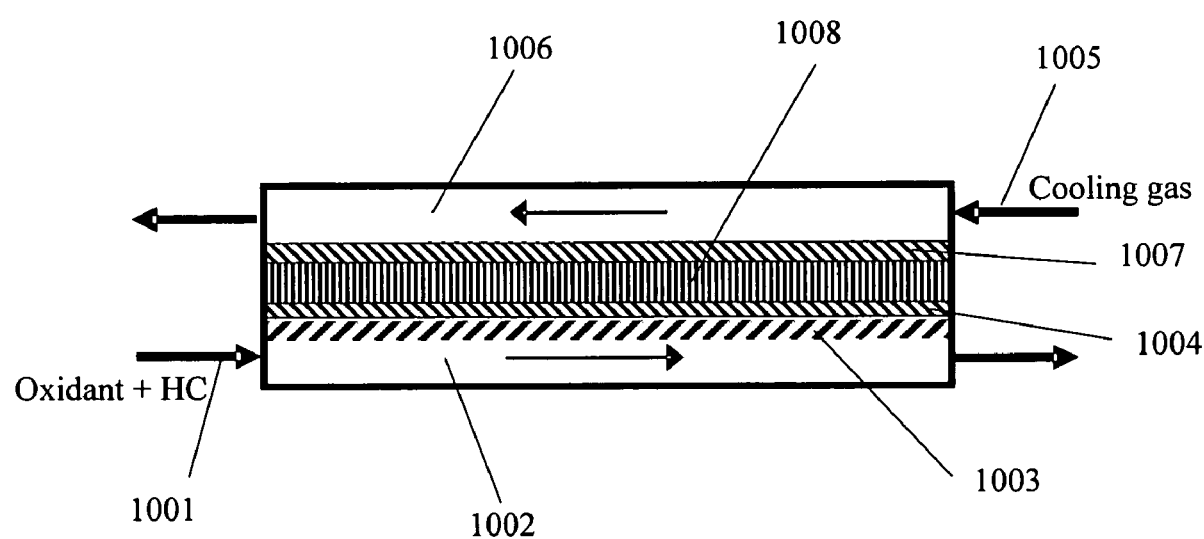
FIG. 10 schematically depicts one embodiment of a reformer system containing a variable conductance layer.

Considering the structure of the reformer system shown in FIG. 10, as the exothermic reforming reaction, such as partial oxidation or autothermal reforming proceeds in catalytic chamber 1002, the heat release drives the temperature up. For most conditions of interest, with an oxygen to carbon ratio in the range of 1.0, the temperature could rise to 1100° C. or more. Such high temperatures would degrade the catalysts and could damage the reformer structure. However, as the temperature of the catalyst layer 1003 rises, the heat is transferred to metal layer 1004. As this metal layer reaches the temperature $T_A$, the thermal conductivity of the variable conductance layer 1008 would transition to the high thermal conductivity state and conduct the excess reaction heat to the metal layer 1007 and to the flowing gas stream 10006 thus extracting the heat from the surface 1004 and the catalyst 1003. The variable conductance layer acts as a thermostat, adjusting its thermal conductivity to hold the temperature of the reforming catalyst 1003 near the temperature $T_A$. The composition and structure of the variable conductance layer may be chosen to hold the reformer catalyst 1003 within the desirable range providing good activity and yet good stability. A desirable temperature would be 500 to 900° C. A more desirable range would be 650 to 800° C. and a most desirable range would be 700 to 750° C. Also, the cooling flow can be co-current with the reactant flow or the cooling flow can be counter current with the cooling flow.

Figure 11:
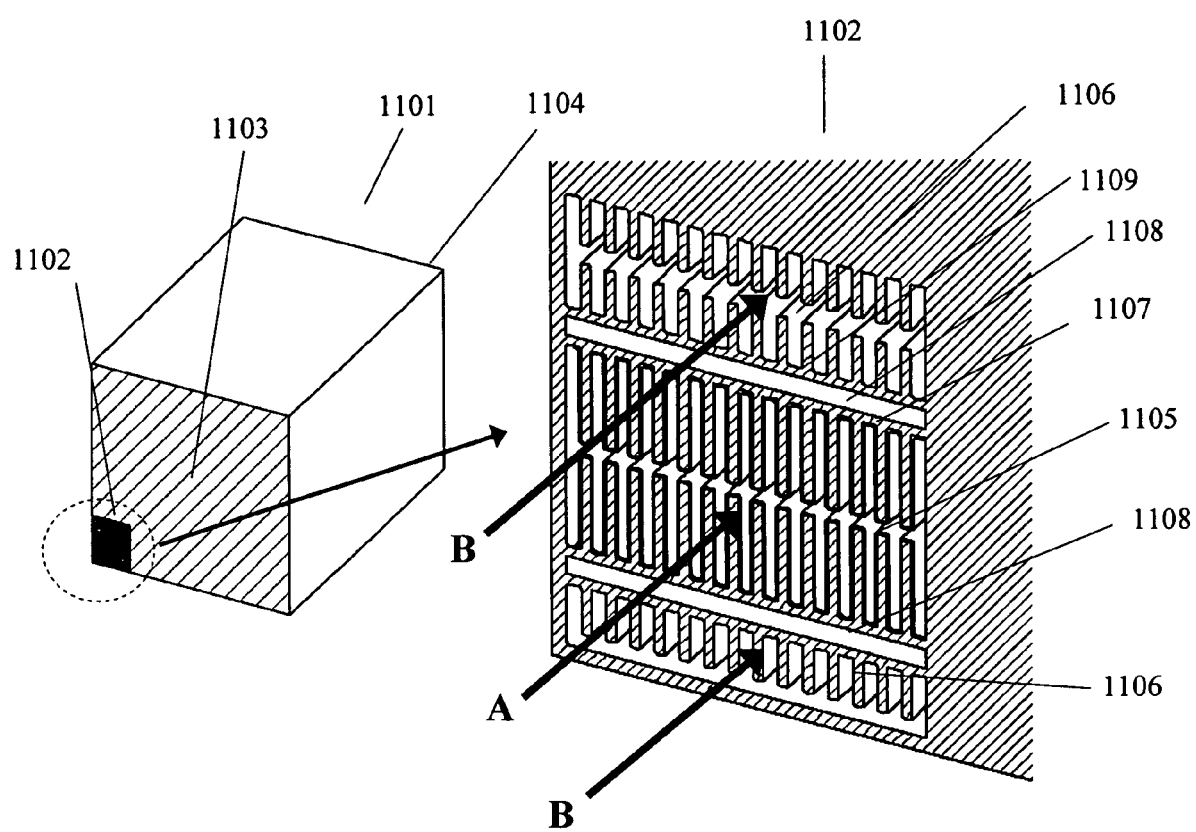
FIG. 11 depicts a mechanical design incorporating the variable conductance layer of FIG. 10.

One specific mechanical embodiment is depicted in FIG. 11. This embodiment is directed to a design with substantially increased geometric area for the reforming catalyst and the cooling section. In FIG. 10, the geometric surface of metal wall 1004, upon which the catalyst is applied, is limited, and may not allow the application of a sufficient amount of catalyst. The catalyst layer must be relatively thin, typically 5 micrometers to 1 millimeter, to provide good heat transfer from the catalyst to the metal wall. Similarly, the cooling surface of wall 1007 has limited geometric surface to remove heat and transfer it to the flowing fooling gas. FIG. 11 shows the reformer 1101 composed of rows of finned channels as shown in the expanded view of section 1102. These finned channels pass from inlet end 1103 to outlet 1104. The finned channels are divided into two separate sections, 1105, the reforming flow path and 1106, the cooling flow path. The fins in section 1105 provide an increase in geometric surface area upon which the catalyst can be coated. The fins in section 1106 provide an increase in surface for the transfer of heat to the flowing cooling medium. The reactant flow A flows into the reforming sections and cooling air B flows into cooling sections 1106. These flows A and B are directed into their respective channels by a manifold (not shown) that covers the inlet face 1103 and outlet face 1104. The oxidation and reforming catalysts are coated onto the surface of fins 1105. There is no catalyst coating on the surface of fins 1106. The fins in sections 1106 are formed of a metal or ceramic and act to conduct heat along the fins to the reformer fin base 1107, then to the variable conductance layer 1108, then to the cooling fin base 1109 and then through the cooling fins 1106 where the heat is removed by the flowing cooling gas B.

The fins 1105 and 1106 are designed with a thickness, length and with material properties such that the heat generated at the reforming catalyst coated surface of flow path 1105 is conducted to the cooling channels 1106 and dissipated without allowing substantial overheating of the reforming catalyst. In one configuration, typical dimensions are 10 mm in height and 2 mm in thickness for the fins in the reforming channels 1105, and 5 mm in height and 1 mm in thickness for the fins in the cooling channels 1106. The fin dimensions are optimized based on the desired heat flux and the maximum temperature gradients allowed to maintain good control of the catalyst temperature. Typical fins are in the general rand of about 0.1 mm to about 5 mm in thickness and about 1 mm to about 20 mm in height.

The design and construction of the reformer depicted in FIG. 10 can take many forms that would be apparent to those skilled in the art. FIG. 11 is just one implementation of this general design concept. The essential elements are to place the partial oxidation or autothermal reforming catalyst on a structure with a high thermal conductivity and have this structure thermally connected to a variable conductance layer which is also thermally connected to a second surface in contact with a cooling medium. The variable conductance layer is designed to increase thermal conductivity at a temperature near the desired operating temperature of the partial oxidation or autothermal reforming catalyst.

Oxidation and Reforming Catalysts

Partial oxidation and autothermal reforming processes of the invention utilize both oxidation and reforming catalysts, with a portion of hydrocarbon fuel introduced into an oxygen containing gas stream oxidized on the oxidation catalyst and the remainder of the introduced fuel reformed on the reforming catalyst. Steam reforming processes of the invention utilize only a reforming catalyst, for reforming of introduced hydrocarbon fuel and steam on the reforming catalyst.

In one embodiment, depicted schematically in FIG. 2, the catalyst 205 is in the form of a thin layer or washcoat on the surface of the cylinder 204 or on fins formed integrally on the inside surface of cylinder 204 to provide more geometric area. In another embodiment, the catalyst is in the form of a sponge, beads, pellets, or mesh filling the channel 206. The catalyst must permit the product $H_2$ good diffusion access to the selective membrane 207.

In one embodiment, the catalyst comprises an oxidation catalyst at the inlet section of channel 206 followed by reforming catalyst in the remainder of channel 206 (or reforming catalyst throughout the channel for a steam reforming process). In another embodiment, the catalyst comprises a mixture of oxidation and reforming catalyst (or reforming catalyst for a steam reforming process) deposited on at least a portion of channel 206. In a further embodiment, the diffusion membrane 207 is a small diameter tube that is wound in a spiral or other fashion so as to extend throughout the interior space of the cylinder 204 and the catalyst 205 is also located throughout the interior space of the cylinder 204. For example, the catalyst may be in the form a packed bed of spheres or other shapes filling the cylinder 204.

In various embodiments, the oxidation and reforming catalysts (or reforming catalyst for a steam reforming process) are in the form of pellets or beads in a container, and/or coated on the walls of a structure such as the cylinder 204 in FIG. 2 or the fins formed on the surface of cylinder 204 or on the fins 1105 of FIG. 11. To form a coating of catalyst on a surface, the catalyst material is typically formed into a sol or colloidal dispersion in a liquid carrier and then applied to internal surfaces of a metal or ceramic substrate to form a layer of catalyst coating on these surfaces.

As used herein, "oxidation catalyst" refers to any catalyst known in the art that is useful for the oxidation of hydrocarbons in the presence of oxygen. A number of examples of oxidation catalysts that are useful in the present invention are provided in U.S. Pat. No. 5,232,357. Generally, the catalytic composition includes elements of Group VI, VII, VIII, or IB of the periodic table of the elements, or combinations thereof. Active catalytic elements include Pd, Pt, Rh, Cu, Co, Fe, Ni, Ir, Cr, and Mo. Preferably, Pd, Pt, Rh, Co, Fe, or Ni is used. These elements may be used separately or in combination, and either as the pure element or its oxide in actual use. A desirable property for the oxidation catalyst is that it exhibit good catalytic activity at low temperatures, so that the oxidation reaction may be initiated at low temperature. The oxidation catalyst may be deposited on a support of aluminum oxide, silicon oxide, zirconium oxide, titanium oxide, cerium oxide or a mixture or combination thereof. The catalyst may optionally include other additives or elements. Examples include cerium zirconium oxide mixtures or solid solutions, silica alumina, Ca, Ba, Si, or La stabilized alumina and other supports known in the art.

Use of a large loading of oxygen-storing material or catalytic metals that undergo oxidation/reduction cycles should be avoided, since they could be detrimental to reformer operation although some level of oxygen storage material may help to optimize performance by providing a means of generating heat at the catalyst as the oxygen storage material is alternately oxidized or reduced during the periodic lean operation.

The catalyst may be prepared by impregnating Pd, Pt, or other active catalyst material on a porous support such as alumina or zirconia. Metal loading is typically in the range of about 0.1 to about 20%, often about 1 to about 10% by weight of the total washcoat material. An oxidation catalyst for use in processing of diesel fuel may also contain catalytic components active for steam cracking, since diesel fuel has a high molecular weight and a propensity to pyrolyze at high temperatures. Examples of suitable additives include basic oxides such as calcium oxide, barium oxide, other alkali or alkaline earth oxides, and rare earth oxides. In addition, the catalyst may contain elements added to stabilize the active catalyst such as La, Ce, or other lanthanide or actinide elements to stabilize Pd or other Group VIII metals. The stabilizing metal could be present as an oxide.

As used herein, "reforming catalyst" refers to any catalyst known in the art that is useful for production of $H_2$ and CO from a hydrocarbon fuel. Examples of useful reforming catalysts include Ni, Ru, Rh, Pd, and Pt. In some embodiments, Pt, Pd, or Rh, or a mixture thereof, is supported on a porous oxide support. In one embodiment, 1% Rh by weight is supported on porous zirconium oxide. This catalyst may be prepared by dissolving rhodium trichloride in water, followed by impregnation of this solution onto zirconium oxide with a high surface area, typically in the range of about 15 to about 150 $m^2/g$. The rhodium concentration is typically in the range of about 0.1 to about 20% of the total washcoat catalyst solid, which includes the rhodium and the oxide support. Often, the rhodium concentration is in the range of about 0.2 to about 10% of the total washcoat loading. The washcoat may be coated onto the device surface at a loading or thickness of about 1 to about 50 $mg/cm^2$, often about 5 to about 15 $mg/cm^2$ of interior geometric surface. Pd and Pt catalysts may be prepared in a similar manner.

For processes utilizing both oxidation and reforming catalysts, such as partial oxidation and autothermal reforming, the oxidation and reforming catalysts may be on separate areas, or may be combined in the same areas of the device. In one embodiment, the oxidation catalyst is separate from and upstream from the reforming catalyst. In another embodiment, oxidation and reforming catalysts are combined into a washcoat to be applied to an interior channel surface. For example, in an embodiment as depicted in FIG. 2, the oxidation catalyst could be coated on the inlet portion of annular region 206 and the reforming catalyst in the middle and/or outlet portion of annular region 206.

In an illustrative example, a Pd oxidation catalyst and a Rh reforming catalyst are combined on a zirconia support to form a catalyst that has the oxidation activity to combust added fuel with $O_2$ in the exhaust stream and the reforming activity to reform the remaining fuel to CO and $H_2$. In one embodiment, the Rh component is impregnated on the high surface area oxide support and then calcined. Separately, the Pd component is coated onto a high surface area support and calcined or fixed. The catalysts are mixed together to form a Pd/Rh oxidation/reforming catalyst. This catalyst can then be used to form a colloidal sol and then washcoated on the structure.

In some embodiments, the oxidation catalyst and the reforming catalyst compositions include the same catalytically active component(s), for example Pt and/or Pd. In other embodiments, the oxidation and the reforming catalyst compositions include different catalytically active components.

Hydrogen Selective Membrane

In some embodiments, a hydrogen selective membrane is used to separate hydrogen from other products of the reforming reaction. In one embodiment depicted in FIG. 2, selective membrane 206 may be in the form of a single tube, a bundle of tubes, a corrugated cylinder with the required surface area or a small diameter tube formed into a spiral to obtain the desired surface area. In one embodiment, the selective membrane comprises a metal membrane such as palladium or an alloy including palladium, palladium-silver, or palladium-copper as described in Ackerman and Koskinas (1972) *Journal of Chemical and Engineering Data* 17(1):51-55. In another embodiment, the selective membrane comprises a ceramic membrane with a high selectivity for $H_2$, such as those described by Balachandran et al. (2002) in "*Recent advances in the development of dense ceramic membranes for hydrogen separation*" Preprints of Symposia, American Chemical Society, Division of Fuel Chemistry 47(2): 820-821 and Siriwardane et al. (2003) *Applied Surface Science* 217(1-4):43-49. Optionally, the outer surface of the selective membrane may be coated with a catalyst for the water gas shift catalyst, equation 1, to increase the conversion of CO to $H_2$.

Fuel Injection

In some embodiments, a fuel injector is used to introduce hydrocarbon fuel into a flowing gas stream to produce a rich mixture. A number of fuel injectors suitable for use in the invention are well known in the art. In some embodiments of the invention, pressurized fuel is supplied to the injector and the injector then opens and closes a flow control valve to turn the fuel flow on and off. Such injectors have been extensively developed as automotive fuel injectors and are described, for example, in U.S. Pat. Nos. 6,454,192, 5,979,866, 6,168,098, and 5,950,932. Such injectors utilize a low pressure supply of fuel, in the range of 30 to 600 psig and can turn fuel flow on and off very rapidly, at a speed that is typically in the range of 0.2 to 1 millisecond, using an electrical signal to move a solenoid or valve within the injector. Such fuel injectors control the fuel flow rate by opening and closing the injector very rapidly, with the fraction of time open set to control the fuel flow. For use in devices of the invention, the frequency of this opening and closing can be very fast, so that the fuel flow is essentially continuous. For example, using a frequency of 10 to 200 Hz and controlling the fraction of time open, the fuel flow rate can be controlled to produce the desired equivalence ratio during rich pulses. The fuel injector is then fully closed during the lean periods. Thus, such fuel injectors may be operated with two frequency components, a high frequency component that would be used to give the required fuel flow rate during the rich and lean periods. The injector would be essentially off for the lean periods, defined the second frequency of operation. If some fuel flow is desired during the lean periods to maintain fuel processor catalyst temperature, then high frequency operation of the injector with a very low fraction of open time would result in a very low fuel flow.

Other types of injectors may also be used, such as air assist injectors. Air assist injectors utilize pressurized air, which flows through the injector with the fuel to obtain a desired fuel droplet size, spray pattern, or spray direction, or to utilize fuel at a lower supply pressure. Multiple injectors may also be used. As another alternative, the injection means may include a simple nozzle to disperse and direct the fuel spray, this nozzle being connected to a fuel line which supplies the fuel in pulses from a pulse pump or other means. The injected fuel must be transferred to the fuel processor catalyst in a short time and it would be disadvantageous for it to remain in liquid form on pipe or component walls. One embodiment which provides a solution to this problem includes direct spraying of the fuel onto the catalyst surface, limiting the interaction of the fuel with potentially cold metal surfaces of the fuel processor or the exhaust system. Another embodiment includes spraying of the fuel on a very hot surface to flash vaporize it. A further embodiment includes pre-vaporization of the fuel in a separate hot chamber, followed by release of the vaporized fuel through an injector. For fuels with a higher molecular weight such as gasoline, jet fuel or diesel fuel, spraying the fuel onto a hot surface or allowing the fuel to remain at high temperature for long periods, more then a fraction of a second, can result in pyrolysis of the hydrocarbons to form carbon or non-reactive hydrocarbon species. For such fuels, spraying the fuel directly onto the catalyst could be highly desirable.

Pressurized Storage of Liquid Reactants

Figure 3:
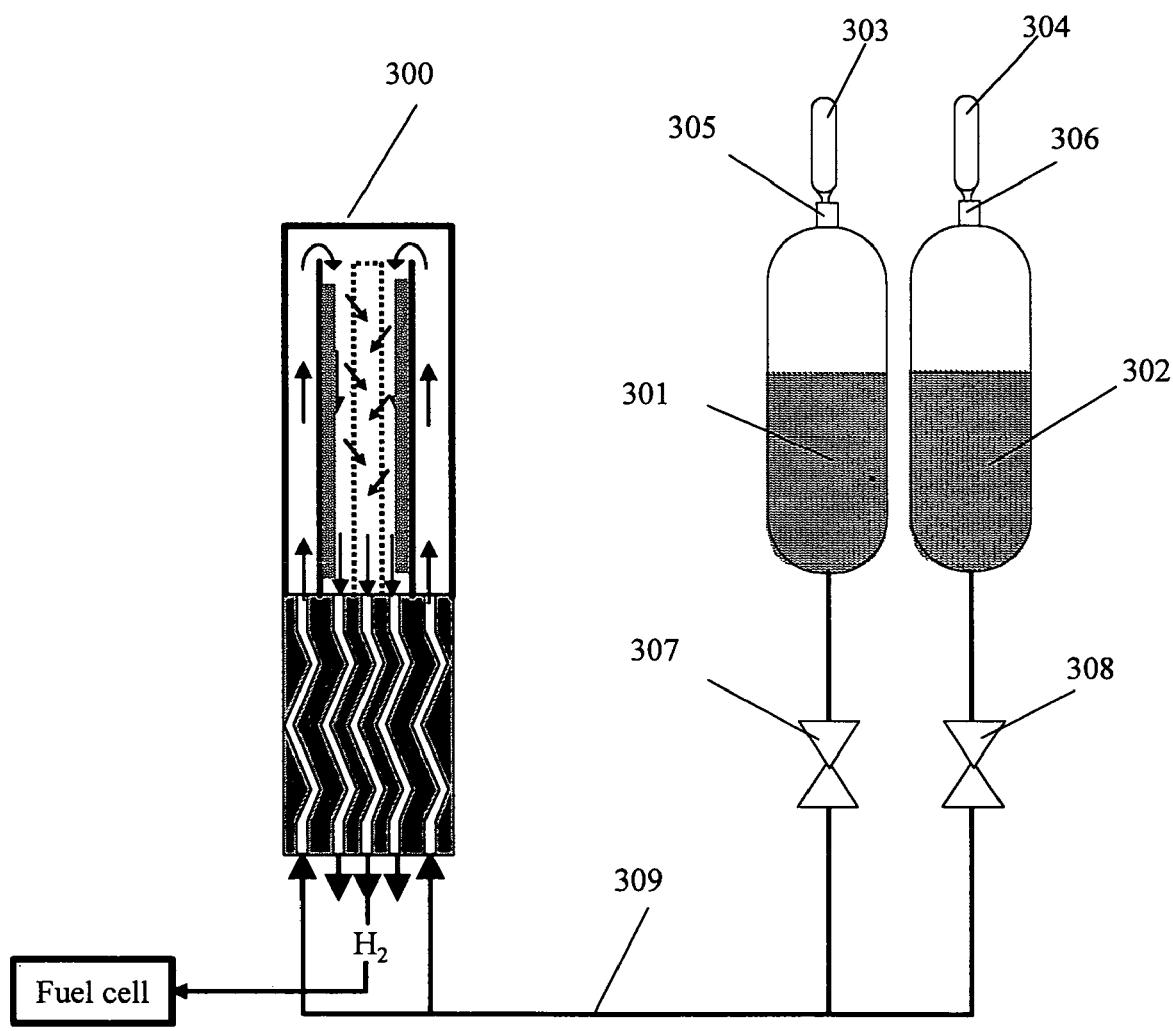
FIG. 3 schematically depicts an embodiment of a fuel processor for reforming of hydrocarbon fuel to hydrogen, with pressurized tanks for liquid reactants.

Typically, gas compression is not required in the reforming processes described herein when all the reactants are introduced as liquids. Gas compression is a significant parasitic load on the system which would make high pressure reforming unattractive for some commercial applications. In one embodiment, a highly portable system can be assembled in which high pressure $CO_2$ cartridges would provide the pressure to the liquid storage tanks. This is shown in the system depicted in FIG. 3 where the fuel processor unit 300, similar to the fuel processor depicted in shown in FIG. 2, is supplied with hydrogen peroxide solution 301 and hydrocarbon liquid 302 in tanks. These tanks can be pressurized with air via a mechanical pump or by $CO_2$ cartridges 303 and 304. The tanks can be filled with the reagents and then sealed and the $CO_2$ cartridges discharged through a one way valve 305 and 306 to pressurize the liquid feeds. The filling of the tanks can be made more convenient by having the liquid contents in plastic containers or plastic bags that are inserted into the pressure vessels 301 and 302 and then the pressure vessels sealed and pressurized. Insertion of the plastic container could open or puncture the container so the fluid would flow out of the pressurized container when pressurized. The flow of the liquids into the fuel processor is then controlled by valves 307 and 308. These reactants then flow into the heat exchanger through lines 309. In one embodiment, valves 307 and 308 are spray type injectors similar to those used on automobile fuel injection systems and are placed at the entrance to the heat exchanger where the injection of fine droplets of fuel and hydrogen peroxide solution can facilitate the evaporation of the liquid reactants.

Start-Up Procedures

During start-up, both the catalyst supporting surface 204 and the heat exchanger 201 depicted schematically in FIG. 2 can be electrically heated by an external power source such as an electric heater, so that the hydrocarbon and hydrogen peroxide solution mixture, or other reactants, can reach the temperature required for reaction on the autothermal reforming catalyst. An important design aspect of a portable system often is that the thermal mass of the heat exchanger, the catalyst supporting surface, and the electrical heating components be sufficiently small that they heat up quickly and require only a small amount of electrical power.

In addition to the start-up procedure described above, hydrogen peroxide may be catalytically decomposed in a section of the heat exchanger (for example, 201 of FIG. 2), and the heat of reaction would contribute to pre-heating the heat exchanger. In addition, the entire fuel processor 200 can be insulated to minimize heat loss and to further increase the efficiency of hydrogen production.

Thermodynamics

Energy balance calculation of the autothermal reforming reaction using hydrogen peroxide as a source of oxygen and water shows that the effective S:C ratio depends on the concentration of the hydrogen peroxide solution since the steam is provided by the water and the decomposition of the hydrogen peroxide. Table 1 gives the resulting S:C ratio when reforming diesel fuel in an autothermal mode for various hydrogen peroxide solution inlet concentrations. In this particular case, the target reaction temperature is 700° C., and the inlet reactants are assumed to be preheated to 400° C. It can be seen from this table that a desirable hydrogen peroxide concentration range is 20 to 45%, with an optimal range of 25 to 40%. In some embodiments of the invention, a hydrogen peroxide concentration of any of about 20, 25, 30, 35, 40, or 45% is used. In some embodiments, a hydrogen peroxide concentration of any of at least about 20, 25, 30, 35, or 40%, with an upper limit of any of about 25, 30, 35, 40, or 45% hydrogen peroxide is used.

TABLE 1

| | $H_2O_2$ concentration (% w in $H_2O$) | S:C ratio (mol/mol) |
|---|---|---|
| 1. | 15 | 12.2 |
| 2. | 20 | 7.4 |
| 3. | 25 | 5.2 |
| 4. | 30 | 4.0 |
| 5. | 35 | 3.3 |
| 6. | 40 | 2.7 |
| 7. | 45 | 2.3 |

Use of Fuel Processor in Conjunction with a Fuel Cell

The fuel reforming system described above can be combined with a fuel cell to provide electrical power. Non-limiting examples of fuel cells which can be used in accordance with the invention include a phosphoric acid fuel cell, a PEM or proton exchange membrane fuel cell, or a solid electrolyte fuel cell, or other types of fuel cells known to those of skill in the art. All of these devices can use the hydrogen produced by the reformer system described herein. The hydrogen product stream flows to the fuel cell and the fuel cell consumes the hydrogen by combining it with oxygen in air, which is also fed to the fuel cell, to produce electrical power. In one embodiment, a pure hydrogen stream produced as described above is utilized in a PEM fuel cell. A fuel cell powered with hydrogen produced as described herein may be used, for example, as a portable power source, e.g., for battlefield use, in a vehicle, for an auxiliary power unit for generation of backup power, or for a communication switching station.

Advantages of the Invention

Catalyst poisoning by sulfur: High sulfur fuels tend to deactivate reforming catalysts, thereby accelerating the deactivation of the catalyst. By operating in pulse mode, the periodic or cyclic lean/rich conditions allow the catalyst to periodically regenerate (burn off the coke buildup) during the lean periods.

No gas compression required: Since the reactants are in liquid phase, no gas compression is required to operate the reformer at elevated pressures. Providing the reactants at high pressure as liquids is much more efficient than compressing a gas to the same pressure.

Compactness of the system: The combined features of the system result in a compact, portable system suitable for a range of portable power applications.

Light weight processor: The combined features of the system result in a low mass system conducive for portable power uses.

The following examples are intended to illustrate, but not limit, the invention.

EXAMPLES

Example 1

Preparation of a Reforming and Combustion Catalyst

Synthesis of Zirconia Supported Autothermal Reforming Catalyst

A rhodium catalyst supported on a La—Ce—Zr mixed oxide containing 9% w La and 29% w Ce was prepared as follows: 5 grams of zirconia (DKK Japan, RC-100P) was weighed and dried in air for 8 hours at 110° C. An aqueous solution of cerium and lanthanum nitrate hydrate, for preparation of a final catalyst with a composition of 29% w $CeO_2$, 9% w $La_2O_3$ was then added to the zirconia and kneaded using a ceramic spatula to form a dry powder. The impregnated powder was dried in air at 110° C. for 6 hours and then calcined in air at 600° C. for 4 hours. The resulting powder was weighed and ground lightly in a mortar and pestle. A solution of rhodium trichloride in water was then added to form a wet powder, to make a final catalyst with a composition of 1% w Rh. The impregnated powder was dried in air at 110° C. for 6 hours and then calcined in air at 700° C. for 4 hours.

Coating the Test Reactor

The mixture was ball milled with water to form a colloidal sol of the catalyst in water. This sol was coated onto the inside surface of a Titanium tube of 1.086 cm internal diameter to form a coating with a density of 4.34 mg/cm² and covering a length of 50.9 cm of the inside surface of the tube. The final coated tube contained 0.753 g of catalyst.

Example 2

Test of Diesel Reforming with Hydrogen Peroxide in a Wall Coated Reactor

Proof of concept experiments for the autothermal reforming of diesel fuel, with hydrogen peroxide as the oxidant, were performed in an annular wall coated bench-scale reactor. The catalyst described in section Example 1 was tested, with control of the addition of diesel fuel to allow periodic lean operation to prevent both deactivation of the catalyst by coking and to maintain the heat generation required for the endothermic reforming reaction.

Figure 4:
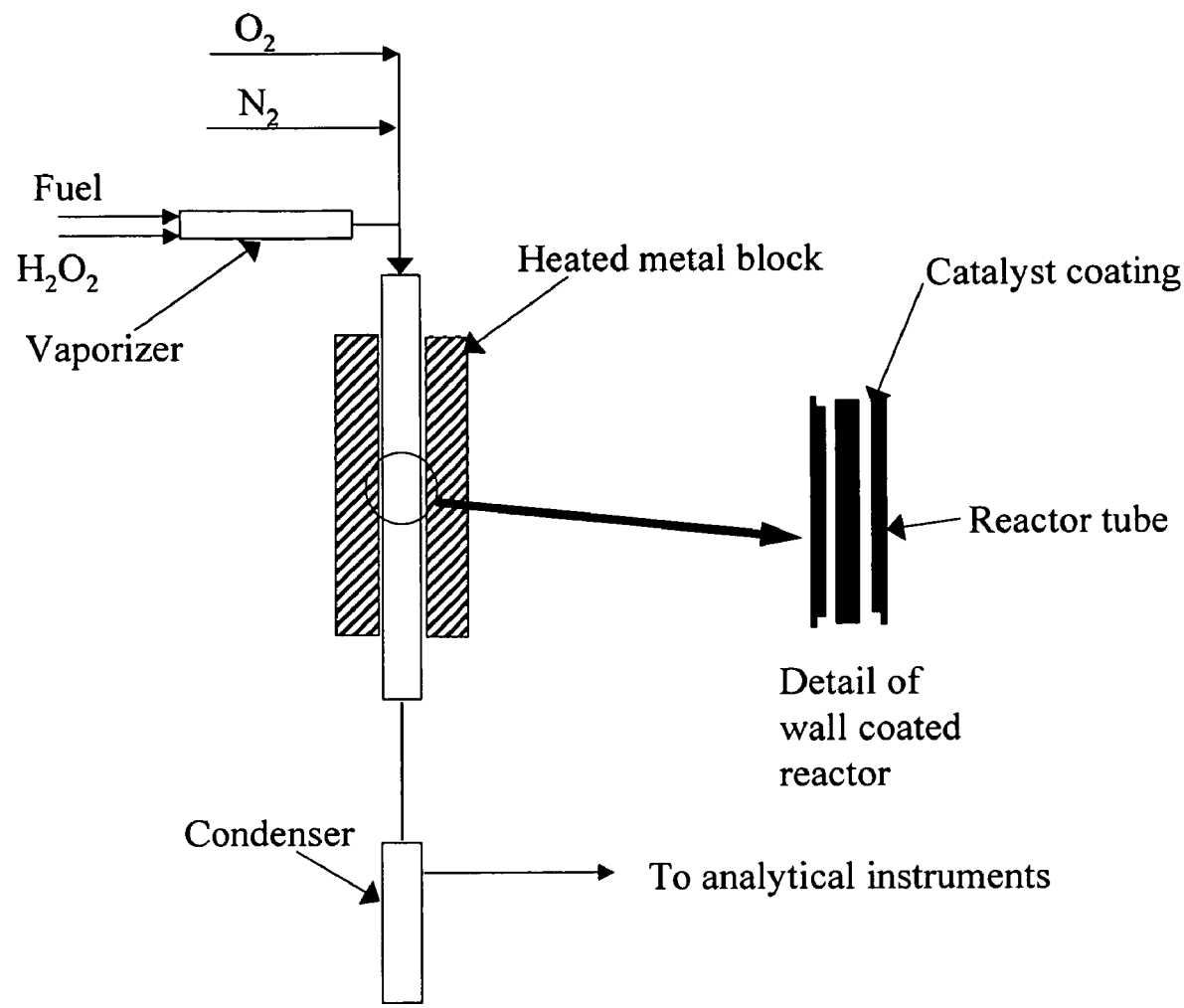
FIG. 4 schematically depicts the experimental setup of the tube wall-coated reactor described in Example 2.

The experiments were performed in a titanium tube wall-coated reactor in the system pictured in FIG. 4. The titanium tube was enclosed in a heater, the heater covering a length well beyond the catalyst coated section. A solution of hydrogen peroxide, 25-32 wt % in water, was used with ultra-low sulfur diesel fuel (approximately 15 ppmw sulfur) for the tests. The test reactions were performed at 3 to 5 atm and at 500 to 750° C. The product stream was analyzed by both GC and NDIR equipment to measure $H_2$, $CO_2$, CO, methane, and unconverted hydrocarbons in the outlet gas stream. The hydrocarbon-rich phase flow rate was then set at 3 to 5 times the lean phase flow rate. The rich conditions were essentially those shown in Table 2 with the resulting S/C ratios shown therein.

Results

The experiments were designed to determine the effect of reaction temperature, peroxide concentration, injection cycle period, and the lean to rich ratio on the reaction performance.

Figure 5:
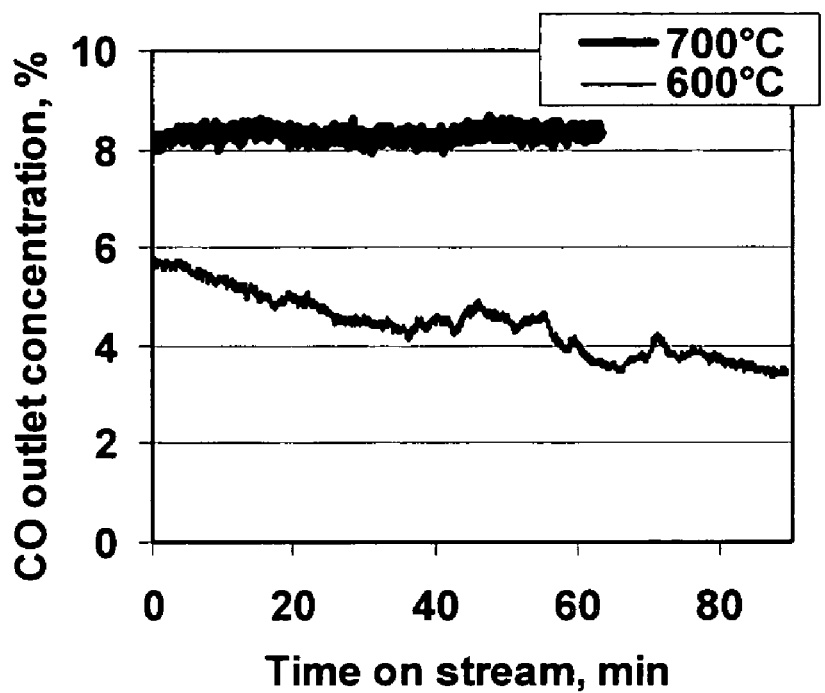
FIG. 5 shows the influence of reaction temperature on catalyst stability, as described in Example 2. P=4.5 atm, $H_2O_2$ concentration=25% w/w; S:C ratio (during hydrocarbon rich phase)=5.0, 30% rich phase and 70% lean phase.

1. FIG. 5 compares the performance of the reaction at two different temperatures, 600 and 700° C. with periodic lean operation. In this test, the S/C ratio was 5 during the rich portion of the cycle. During the lean portion of the cycle, the fuel flow rate was decreased to give an S/C ratio of 38 to enhance the maintenance of catalyst activity. At 700° C., the deactivation by sulfur and coking was less than at 600° C. At 700° C., the catalyst activity was stable.

Figure 6:
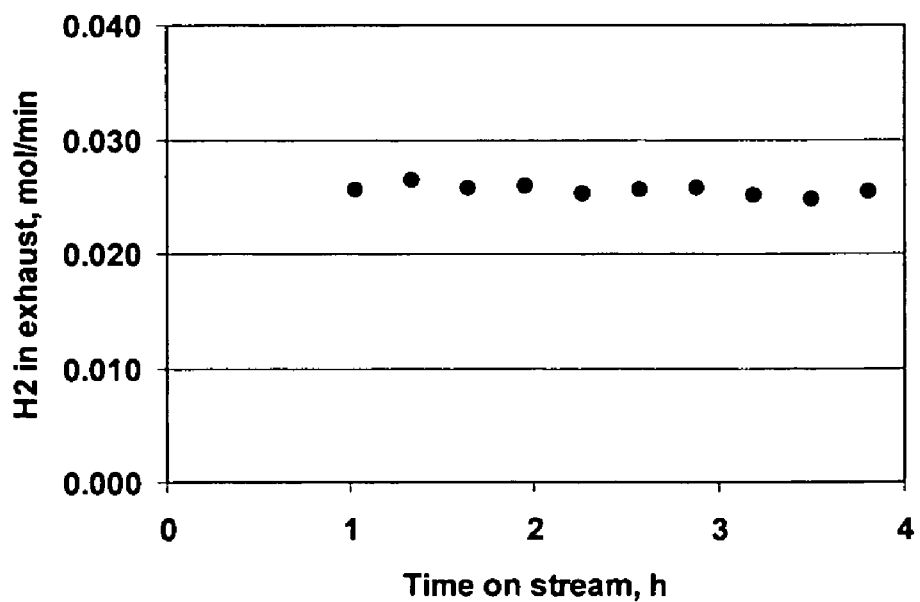
FIG. 6 shows the hydrogen exhaust flow rate (measured by gas chromatography) versus time on stream, showing stability of the catalyst activity and selectivity, as described in Example 2. T=700° C., P=4.5 atm, $H_2O_2$ concentration=25% w, S:C ratio (during hydrocarbon rich phase)=3.9. 30% rich phase and 70% lean phase.

2. FIG. 6 shows the measured $H_2$ concentration at the reactor exit with a lower S/C ratio of 3.9 during rich period and an S/C ratio of 26 during the lean period where operation at 60% lean conditions still resulted catalyst deactivation. At this S/C ratio, the reforming activity was stable.

Figure 7:
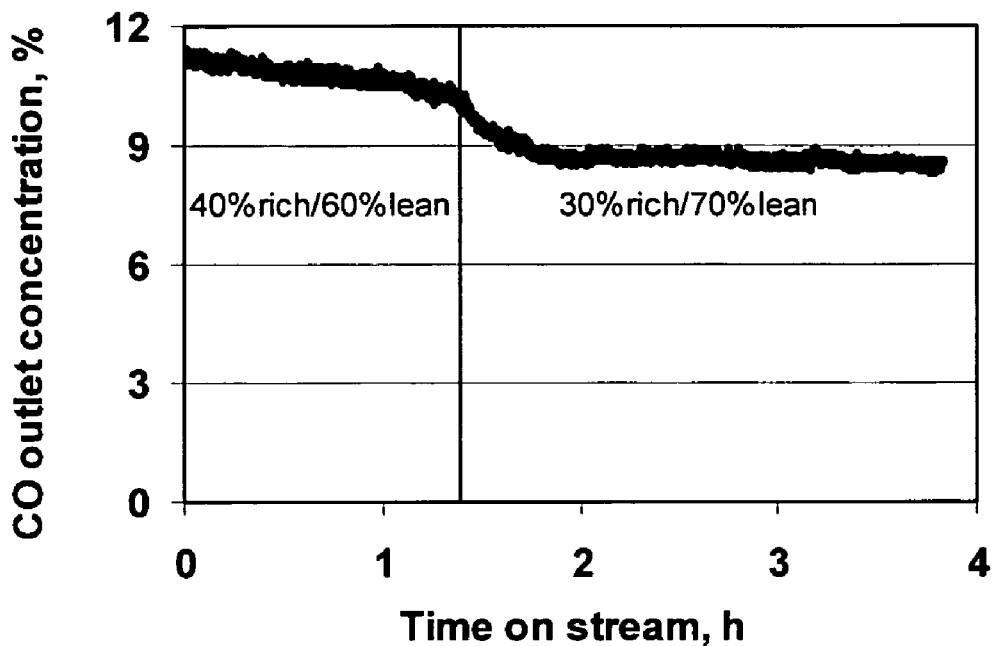
FIG. 7 shows influence of the rich/lean period ratio on catalyst stability, as described in Example 2. T=700° C., P=4.5 atm, $H_2O_2$ concentration=32% w, S:C ratio (during hydrocarbon rich phase)=4.1.

3. FIG. 7 demonstrates the effect of the periodic lean operation in maintaining stable reformer operation. For the first 1.3 hours, the periodic lean operation was adjusted to be 40% of the time rich (S/C ratio of 4.1) and 60% of the time lean (S/C ratio of 27). With 60% lean time, the lean time was insufficient to maintain constant catalyst activity. As the lean time was increased to 70%, the activity became stable.

Figure 8:
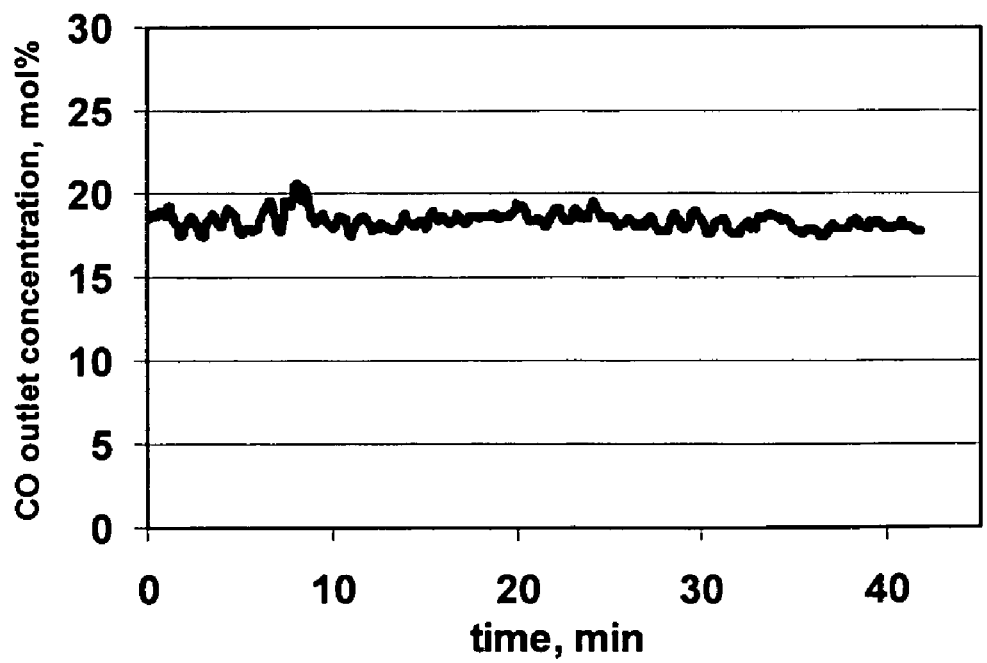
FIG. 8 shows the results of a reforming test with Jet-A fuel with 3000 ppm sulfur at 750° C., P=5.1 atm. $H_2O_2$=50% w, 80% rich time at S:C of 2.1 and 20% lean time at a S:C of 14.

4. FIG. 8 shows the performance of a different fuel, Jet-A with 3000 ppm sulfur. This is a typical fuel used in commercial jet engines. The sulfur concentration was adjusted to 3000 ppm by adding benzothiophene. The test conditions were a rich time of 80% at an S/C ratio of 2.1 and 20% time at lean operation with a S/C ratio of 14. The temperature was 750° C. with a 50% $H_2O_2$ solution. Operation at such a low S/C ratio would not be possible without periodic lean operation as described in this application.

5. Table 2 shows the experimental values of S:C ratios produced at different $H_2O_2$ and diesel fuel flow rates under hydrocarbon-rich reaction conditions used in Example 2.

TABLE 2

Experimental Values of Diesel and Hydrogen Peroxide Solution Flow Rates and Corresponding S:C During Hydrocarbon-Rich Phase.

| $H_2O_2$ concentration % weight | $H_2O_2$ solution flow rate mL/h | hydrocarbon flow rate mL/h | S:C (during hydrocarbon-rich phase) mol/mol |
|---|---|---|---|
| 25 | 53.8 | 20.0 | 3.9 |
| 32 | 40.5 | 15.0 | 4.1 |

All publications, patents and patent applications cited herein are hereby incorporated by reference in their entirety for all purposes to the same extent as if each individual publication, patent or patent application were specifically and individually indicated to be so incorporated by reference.

Although the foregoing invention has been described in some detail by way of illustration and examples for purposes of clarity of understanding, it will be apparent to those skilled in the art that certain changes and modifications may be practiced without departing from the spirit and scope of the invention, which is delineated in the claims below. Therefore, the description should not be construed as limiting the scope of the invention.

We claim:

1. A process for producing $H_2$ and CO, comprising:
   introducing a hydrocarbon fuel and either an aqueous solution of $H_2O_2$ or $H_2O$ and $O_2$ produced from the aqueous solution, to combine into a gas stream to produce a rich mixture comprising the hydrocarbon fuel;
   wherein said rich mixture is produced upstream from a catalytic zone comprising a reforming catalyst and an oxidation catalyst;
   wherein said rich mixture flows through said catalytic zone;
   wherein a portion of the hydrocarbon fuel in the rich mixture is oxidized on the oxidation catalyst and essentially all of the remaining hydrocarbon fuel is reformed on the reforming catalyst, thereby producing $H_2$ and CO, and;
   at least once every ten minutes the rich mixture is converted to a lean mixture for a short period of time by steps comprising temporarily decreasing or stopping the hydrocarbon fuel introduction, thereby forming lean-rich cycles;
   wherein the short periods of lean mixture production are functional to help maintain catalyst activity but are sufficiently short that a temperature of the catalytic zone remains between about 500 and about 850° C. throughout the lean-rich cycles and the lean periods are about 20% or less of the lean-rich cycle time.

2. A process according to claim 1, further comprising a mixing volume downstream of the catalytic zone, wherein the hydrogen concentration at the outlet of the mixing volume is substantially constant through the lean-rich cycles.

3. A process according to claim 1, further comprising a mixing volume downstream of the catalytic zone to mix the lower hydrogen concentration produced during a lean cycle with the higher hydrogen concentration produced during rich cycles, wherein the mixing volume provides a volume 1 to 5 times the volume of lean mixture flowing through the catalytic zone over the short lean periods.

4. A process according to claim 1, wherein the temperature of the catalytic zone remains at or above about 600° C. throughout the lean-rich cycling.

5. A process according to claim 1, wherein the aqueous solution comprises 20-50% $H_2O_2$ by weight.

6. A process according to claim 1, wherein the transitions from rich to lean raises an $H_2O$ to carbon ratio for the mixture by a factor of two or more.

* * * * *